(12) United States Patent
Martinez Tarradell et al.

(10) Patent No.: US 10,506,502 B2
(45) Date of Patent: Dec. 10, 2019

(54) AIR INTERFACE RESOURCE UTILIZATION TECHNIQUES FOR WIRELESS COMMUNICATION NETWORKS

(71) Applicant: Intel IP Corporation, Santa Clara, CA (US)

(72) Inventors: Marta Martinez Tarradell, Hillsboro, OR (US); Debdeep Chatterjee, San Jose, CA (US); Ralf Bendlin, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/756,516

(22) PCT Filed: Apr. 2, 2016

(86) PCT No.: PCT/US2016/025771
§ 371 (c)(1),
(2) Date: Feb. 28, 2018

(87) PCT Pub. No.: WO2017/058288
PCT Pub. Date: Apr. 6, 2017

(65) Prior Publication Data
US 2018/0262975 A1  Sep. 13, 2018

Related U.S. Application Data

(60) Provisional application No. 62/308,173, filed on Mar. 14, 2016, provisional application No. 62/233,890, filed on Sep. 28, 2015.

(51) Int. Cl.
*H04W 48/16* (2009.01)
*H04W 16/10* (2009.01)
(Continued)

(52) U.S. Cl.
CPC .......... *H04W 48/16* (2013.01); *H04W 16/10* (2013.01); *H04W 48/10* (2013.01);
(Continued)

(58) Field of Classification Search
CPC ... H04W 48/16; H04W 16/10; H04W 56/001; H04W 48/10; H04W 74/008; H04W 48/20; H04W 48/12
See application file for complete search history.

(56) References Cited

U.S. PATENT DOCUMENTS

| 2013/0201936 A1* | 8/2013 | Chen | H04W 72/04 370/329 |
|---|---|---|---|
| 2017/0064685 A1* | 3/2017 | Rico Alvarino | H04B 7/0456 |

(Continued)

OTHER PUBLICATIONS

"New Work Item: NarrowBand IOT (NB-IOT)", Qualcomm Incorporated, 3GPP TSG RAN Meeting #69, RP-151621, Sep. 14-16, 2015, 9 pages.

(Continued)

*Primary Examiner* — Sharad Rampuria

(57) ABSTRACT

Air interface resource utilization techniques for wireless communication networks are described. According to various such techniques, one or more narrow band resource regions (NBRRs) may be defined for use in conjunction with narrow band (NB) transmissions in an NB cell. In some embodiments, one or more such NBRRs may be designated as broadcast NBRRs, and may be used to carry a majority, most, or all of the broadcasted information within the NB cell. In various embodiments, another NBRR may be designated as a primary NBRR, and may be used to carry synchronization signals for the NB cell. In some such embodiments, the primary NBRR may also be used to carry NB physical broadcast channel (NB-PBCH) transmissions and NB master information blocks (NB-MIBs). Other embodiments are described and claimed.

23 Claims, 11 Drawing Sheets

(51) Int. Cl.
*H04W 48/10* (2009.01)
*H04W 56/00* (2009.01)
*H04W 48/12* (2009.01)
*H04W 48/20* (2009.01)
*H04W 74/00* (2009.01)

(52) U.S. Cl.
CPC ....... *H04W 56/001* (2013.01); *H04W 74/008* (2013.01); *H04W 48/12* (2013.01); *H04W 48/20* (2013.01)

(56) References Cited

U.S. PATENT DOCUMENTS

2018/0213468 A1* 7/2018 Chatterjee ............ H04L 5/0053
2018/0270008 A1* 9/2018 Yi ....................... H04J 11/0069

OTHER PUBLICATIONS

International Search Report and Written Opinion, dated Jun. 14, 2016, Application No. PCT/US2016/025771, Filed Date: Apr. 2, 2016, pp. 11.
Panasonic, "Common control messages for MTC UEs", 3GPP Draft; R1-152691, 3rd Generation Partnership Projec (3GPP), vol. RAN WG1, No. Fukuoka, Japan; May 25, 2015-May 29, 2015; May 24, 2015, XP050972850, retrieved from http://www.3gpp.org/ftp/Meetings_3GPP_SYNC/RAN1/Docs/.
Huawei, et al., "On frequency hopping relations between channels", 3GPP Draft, R1-154611, 3rd Generation Partnership Project (3GPP), vol. RAN WG1, No. Beijing, China, Aug. 24, 2015-Aug. 28, 2015, Aug. 23, 2015, XP051001865 retrieved from http://www.3gpp.org/ftp/Meetings_3GPP_SYNC/RAN1/Docs/.
Panasonic, "PBCH for MTC UEs", 3GPP Draft; R1-152690, 3rd Generation Partnership Project (3GPP), vol. RAN WG1, No. Fukuoka, Japan; May 25, 2015-May 29, 2015; May 15, 2015, XP050972475, retrieved from http://www.3gpp.org/ftp/tsg_ran/WG1_RL1/TSGR1_81/Docs/.
Qualcomm Incorporated, "System Information", 3GPP Draft, R1-155710 System Information, 3rd Generation Partnership Project (3GPP), vol. RAN WG1, No. Malmo, Sweden, Oct. 5, 2015-Oct. 9, 2015, Sep. 26, 2015, XP051021714, retrieved from http://www,3gpp.org/ftp/tsg_ran/WG1_RL1/TSFR1_82b/Docs/.
Huawei, et al., "On MTC SIB transmission", 3GPP Draft, R1-152458, 3rd Generation Partnership Project (3GPP), vol. RAN WG1, No. Fukuoka, Japan, May 25, 2015-May 29, 2015, May 24, 2015, XP050970898, retrieved from http://www.3gpp.org/ftp/Meetings_3GPP_SYNC/RAN1/Docs/.

* cited by examiner

FIG. 8
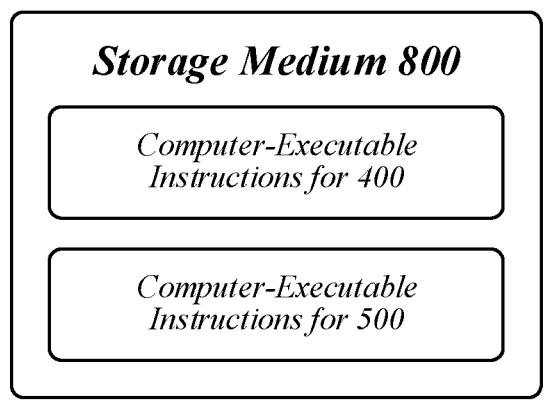
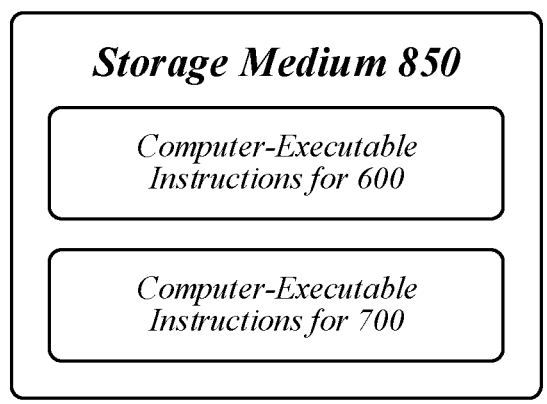

Broadband Wireless Access System 1100

AIR INTERFACE RESOURCE UTILIZATION TECHNIQUES FOR WIRELESS COMMUNICATION NETWORKS

RELATED CASE

This application is a national stage application claiming the benefit of and priority to International Application No. PCT/US2016/025771 entitled "AIR INTERFACE RESOURCE UTILIZATION TECHNIQUES FOR WIRELESS COMMUNICATION NETWORKS" filed Apr. 2, 2016, which claims priority to U.S. Provisional Patent Application No. 62/233,890, filed Sep. 28, 2015, and U.S. Provisional Patent Application No. 62/308,173, filed Mar. 14, 2016, all of which are hereby incorporated by reference in their entirety.

TECHNICAL FIELD

Embodiments herein generally relate to communications between devices in broadband wireless communications networks.

BACKGROUND

Optimized support of a massive number of Cellular Internet of Things (CIoT) or Machine-Type Communication (MTC) devices that have very low device complexity, are latency-tolerant, and require low throughput and very low power consumption, is seen as a key ingredient for next-generation cellular wireless networks. Such designs of CIoT systems can be based on an evolution of 3GPP LTE-Advanced features, such as Release 13 support of low-complexity MTC devices (termed as Category M devices) that need to support a bandwidth of 1.4 MHz on the DL and UL at both RF and baseband irrespective of the system BW. Support for CIoT devices may be provided by a narrowband (NB)-LTE system, in which CIoT devices may perform DL and UL communicates via small bandwidths, such as 180 kHz or 200 kHz bandwidths. In a given NB-LTE system, such bandwidths may be comprised in GSM bands, in LTE guard bands, or within larger LTE system bandwidths (for example, occupying 1 LTE physical resource block (PRB)). Following the LTE design, such NB-LTE systems can use an OFDMA-based multiple access mechanism in the DL and an SC-FDMA (or DFT-S-OFDMA)-based design in the UL. Alternatively, such NB systems for CIoT devices can be designed as a new Radio Access Technology (RAT), e.g., following a clean-slate approach to support CIoT devices, on 200 kHz-wide GSM bands or in the LTE guard bands.

BRIEF DESCRIPTION OF THE DRAWINGS

FIG. 8 illustrates an embodiment of a first storage medium and an embodiment of a second storage medium.

DETAILED DESCRIPTION

Figure 1:
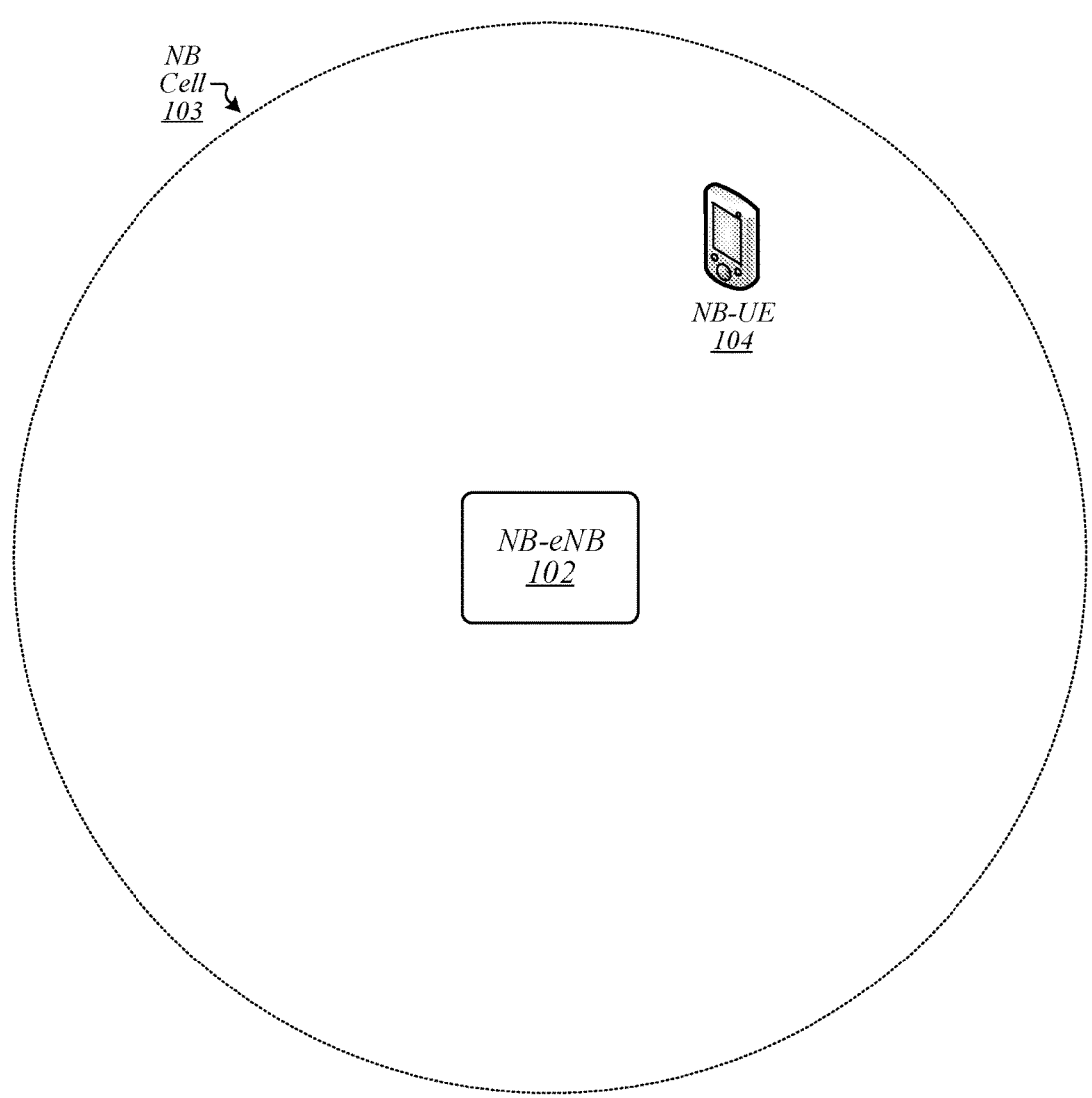
FIG. 1 illustrates an embodiment of a first operating environment.

Air interface resource utilization techniques for wireless communication networks are described. According to various such techniques, one or more narrow band resource regions (NBRRs) may be defined for use in conjunction with narrow band (NB) transmissions in an NB cell. In some embodiments, one or more such NBRRs may be designated as broadcast NBRRs, and may be used to carry a majority, most, or all of the broadcasted information within the NB cell. In various embodiments, another NBRR may be designated as a primary NBRR, and may be used to carry synchronization signals for the NB cell. In some such embodiments, the primary NBRR may also be used to carry NB physical broadcast channel (NB-PBCH) transmissions and NB master information blocks (NB-MIBs). Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100, which may comprise an example of an operating environment in which one or more of the disclosed air interface resource utilization techniques may be implemented according to various embodiments. In operating environment 100, a narrow band (NB)-evolved node B (eNB) 102 serves an NB cell 103. In conjunction with providing service in NB cell 103, NB-eNB 102 may wirelessly communicate with NB user equipment (NB-UE) 104. NB-eNB 102 and NB-UE 104 may be configured to wirelessly communicate with each other in accordance with an NB-LTE bandwidth. In the following discussion, the term "NB transmission" is employed to denote transmission in accordance with the NB-LTE bandwidth, and the term "NB reception" is employed to denote reception in accordance with the NB-LTE bandwidth. The NB-LTE bandwidth may generally comprise a bandwidth that is smaller than a minimum bandwidth that may be permitted in a conventional LTE system. In some embodiments, the NB-LTE bandwidth may comprise a bandwidth corresponding to one LTE physical resource block (PRB). In various embodiments, the NB-LTE bandwidth may comprise a 180 kHz bandwidth. In some embodiments, the NB-LTE bandwidth may comprise a 200 kHz bandwidth. The embodiments are not limited to these examples.

Figure 2:
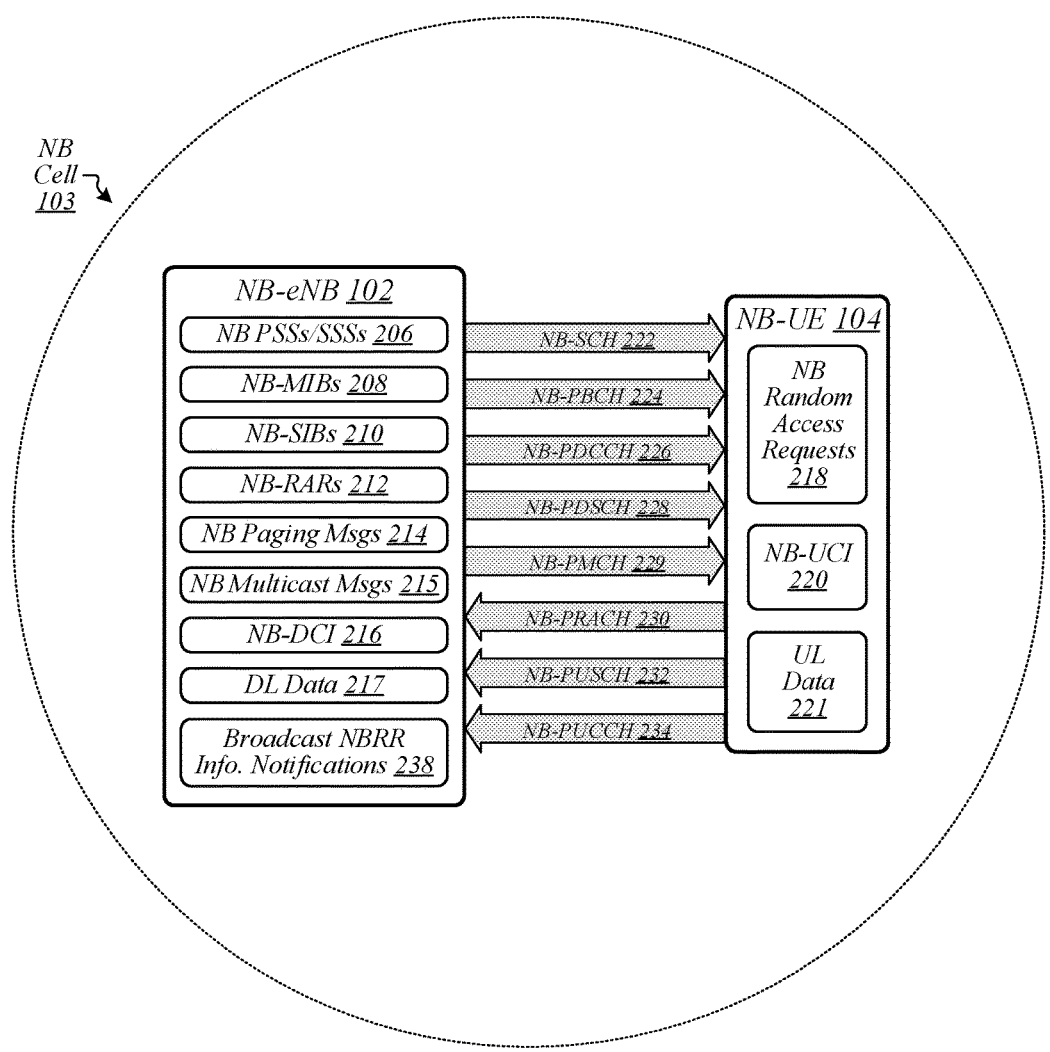
FIG. 2 illustrates an embodiment of a second operating environment.

FIG. 2 illustrates an operating environment 200 that may be representative of various embodiments. In operating environment 200, various types of information may be exchanged between NB-eNB 102 and NB-UE 104 via various defined physical channels. These defined physical channels may include various downlink (DL) physical channels via which NB-UE 104 may receive broadcast, multicast, or unicast transmissions of NB-eNB 102. The DL physical channels may include any or all of an NB synchronization channel (NB-SCH) 222, an NB physical broadcast channel (NB-PBCH) 224, an NB physical downlink control channel (NB-PDCCH) 226, an NB physical downlink shared channel (NB-PDSCH) 228, and an NB physical multicast channel (NB-PMCH) 229. The defined physical channels may also include various uplink (UL) physical channels via which NB-eNB 102 may receive transmission of NB-UE 104. The UL physical channels may include any or all of an NB physical random access channel (NB-PRACH) 230, an NB physical uplink shared channel (NB-PUSCH) 232, and an NB physical uplink control channel (NB-PUCCH) 234. It is worthy of note that not all of the physical channels depicted in FIG. 2 may necessarily be implemented in any given embodiment, and that other types of physical channels not depicted in FIG. 2 may be implemented in any given embodiment. The embodiments are not limited in this context.

FIG. 2 also illustrates examples of various types of signals, messages, and information that NB-eNB 102 and NB-UE 104 may exchange via various physical channels depicted therein. Examples of signals, messages, and information that NB-eNB 102 may transmit in some embodiments include NB primary and secondary synchronization signals (NB PSSs/SSSs) 206, NB master information blocks (NB-MIBs) 208, NB system information blocks (NB-SIBs) 210, NB random access responses (NB-RARs) 212, NB paging messages 214, NB multicast messages 215, NB downlink control information (NB-DCI) 216, and DL data 217. Examples of messages and information that NB-UE 104 may transmit in various embodiments include NB random access requests 218, NB uplink control information (NB-UCI) 220, and UL data 221. It is worthy of note that not all of the signals, messages, and information depicted in FIG. 2 may necessarily be exchanged in any given embodiment, and that other signals, messages, and/or information not depicted in FIG. 2 may be exchanged in any given embodiment. The embodiments are not limited in this context.

Returning to FIG. 1, in some embodiments, NB-eNB 102 may generally be operative to use air interface resources comprised among those of a particular frequency band (an "NB frequency band") in conjunction with transmitting to other devices in NB cell 103 in accordance with the NB-LTE bandwidth. In various such embodiments, the NB frequency band may correspond to a range of frequencies of an LTE carrier defined for use in conventional LTE systems. In some other embodiments, the NB frequency band may correspond to a range of frequencies comprised in an LTE guard band. In yet other embodiments, the NB frequency band may correspond to wireless spectrum of one or more carriers defined for use in non-LTE systems, such as one or more GSM carriers currently used in GERAN systems. In various embodiments, the particular air interface resources that NB-eNB 102 may utilize for NB transmission in NB cell 103 may be specified by an air interface resource utilization scheme (AIRUS) that is implemented in NB cell 103. In some embodiments, the AIRUS may define one or more NB resource regions (NBRRs) that comprise air interface resources that NB-eNB 102 may be permitted to use in conjunction with various types of NB transmissions in NB cell 103. In various embodiments, each such NBRR may comprise a respective subset of the collective set of air interface resources of the NB frequency band. In some embodiments, each NBRR may correspond to a different respective frequency sub-band comprised within NB frequency band. In various embodiments, each NBRR may comprise a bandwidth matching the NB-LTE bandwidth. In some embodiments, each NBRR may comprise a 180 kHz bandwidth. In various other embodiments, each NBRR may comprise a 200 kHz bandwidth. The embodiments are not limited to these examples.

Figure 3:
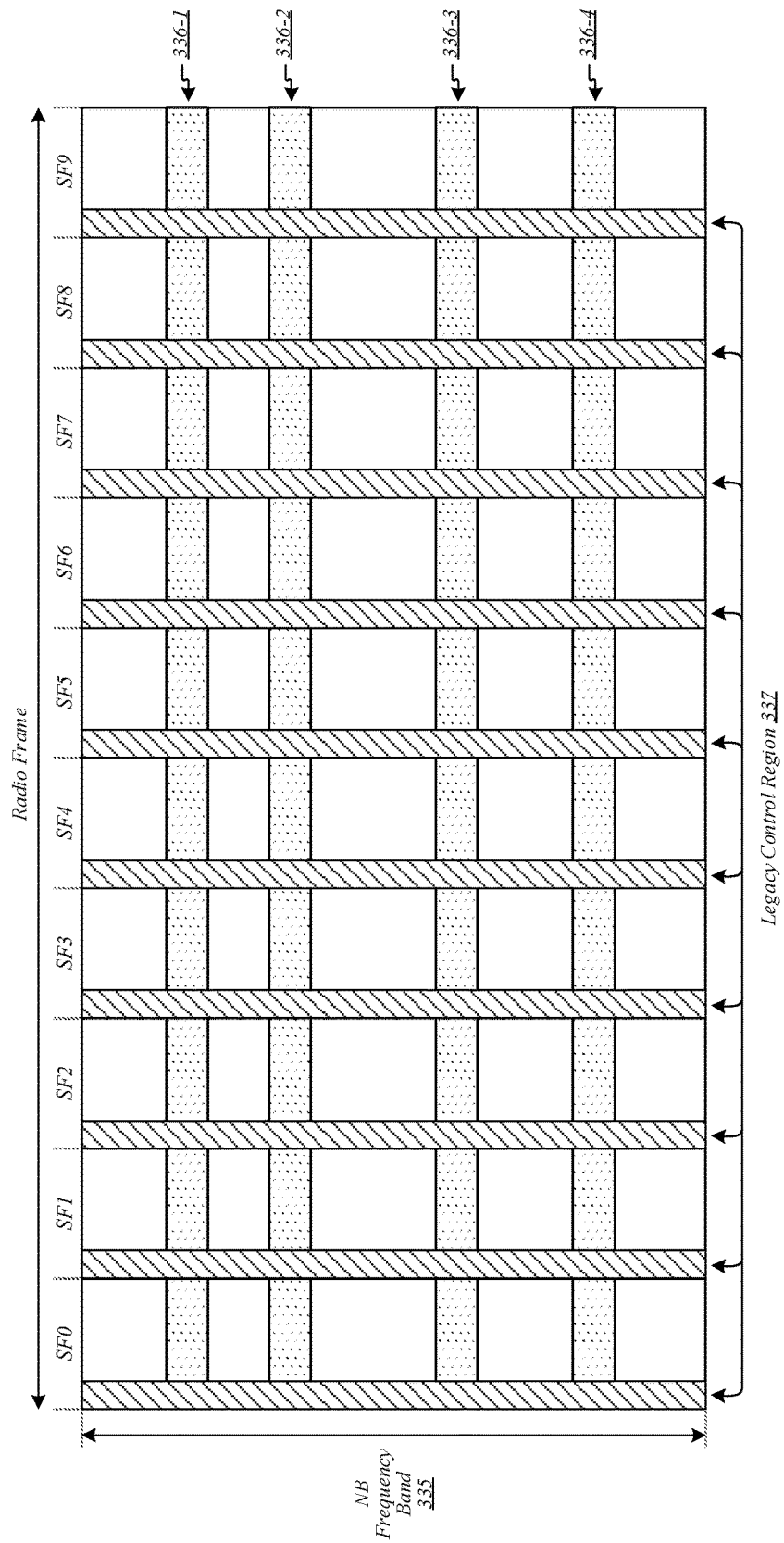
FIG. 3 illustrates an embodiment of a bandwidth allocation scheme.

FIG. 3 illustrates an example of an AIRUS 300 that may be representative of an AIRUS that may be implemented in NB cell 103 of FIG. 1 in some embodiments. According to AIRUS 300, NBRRs 336-1, 336-2, 336-3, and 336-4 may be defined, each of which may comprise a respective subset of the collective set of air interface resources of an NB frequency band 335. In various embodiments, NBRRs 336-1, 336-2, 336-3, and 336-4 may be representative of NBRRs defined for use in conjunction with DL communications in NB cell 103. In some embodiments, each of NBRRs 336-1, 336-2, 336-3, and 336-4 may correspond to a different respective frequency sub-band comprised within NB frequency band 335. In various embodiments, each of NBRRs 336-1, 336-2, 336-3, and 336-4 may comprise a bandwidth matching an NB-LTE m bandwidth in accordance with which NB-eNB 102 and NB-UE 104 may wirelessly communicate in operating environment 100 of FIG. 1. In some embodiments, each of NBRRs 336-1, 336-2, 336-3, and 336-4 may comprise a 180 kHz bandwidth. In various other embodiments, each of NBRRs 336-1, 336-2, 336-3, and 336-4 may comprise a 200 kHz bandwidth. The embodiments are not limited to these examples.

In some embodiments, each of NBRRs 336-1, 336-2, 336-3, and 336-4 may generally be comprised of resource elements (REs) associated with the frequency sub-band to which it corresponds. In various embodiments, each of NBRRs 336-1, 336-2, 336-3, and 336-4 may comprise—with respect to any given time interval—all of the REs of its respective corresponding frequency sub-band over the course of that time interval. In some other embodiments, some REs of a frequency sub-band associated with any given one of NBRRs 336-1, 336-2, 336-3, and 336-4 may be excluded from that NBRR. For example, in various embodiments, as illustrated in FIG. 3, REs of a legacy control region 337 may be excluded from each of NBRRs 336-1, 336-2, 336-3, and 336-4. In some embodiments, legacy control region 337 may comprise a set of REs designated for use in conjunction with DL control signaling in conventional LTE systems. In various embodiments, legacy control region 337 may comprise—across all of the subcarriers comprised in NB frequency band 335—the REs of the first three OFDM symbols of each of the ten subframes SF0 to SF9 of a given radio frame. In some embodiments, excluding REs of legacy control region 337 from the various NBRRs defined by AIRUS 300 may facilitate coexistence with such conventional LTE systems. The embodiments are not limited in this context.

Returning to FIG. 2, in various embodiments, an AIRUS implemented in NB cell 103 may define one or more wireless resource usage roles. In some embodiments, with respect to any given wireless resource usage role, the AIRUS may define particular types of communications that are to be conveyed via an NBRR being used according to that wireless resource usage role. In various embodiments, using an NBRR according to a given wireless resource usage role may involve using the NBRR to carry a particular set of one or more physical channels. In some embodiments, using an NBRR according to a given wireless resource usage role may additionally or alternatively involve using the NBRR to carry one or more particular types of messages, signals, and/or information. The embodiments are not limited in this context.

In various embodiments, an AIRUS implemented for NB cell 103 in operating environment 200 may define a primary NBRR usage role. The term "primary NBRR" is employed herein to denote an NBRR designated for use in accordance with such a primary NBRR usage role. In some embodiments, the primary NBRR may be used to carry NB-SCH 222. In various embodiments, the primary NBRR may also be used to carry NB-PBCH 224. In some such embodiments, NB-eNB 102 may use the primary NBRR for transmission of NB-MIBs 208. The embodiments are not limited in this context.

In various embodiments, an AIRUS implemented for NB cell 103 in operating environment 200 may define a broadcast NBRR usage role. The term "broadcast NBRR" is employed herein to denote an NBRR designated for use in accordance with such a broadcast NBRR usage role. In some embodiments, a broadcast NBRR may generally be used to carry broadcasted information of NB cell 103. In various embodiments, the broadcast NBRR may be used to carry a majority of the broadcasted information of NB cell 103. In some embodiments, the broadcast NBRR may be used to carry most or all of the broadcasted information of NB cell 103. In various embodiments, the broadcast NBRR may be used to carry NB-PBCH 224, and NB-eNB 102 may use the broadcast NBRR for transmission of NB-MIBs 208. In some embodiments, NB-eNB 102 may additionally or alternatively use the broadcast NBRR for transmission of any or all of NB-SIBs 210, NB-RARs 212, NB paging messages 214. In various embodiments, the broadcast NBRR may additionally be used to carry multicasted information of NB cell 103. For example, in some embodiments, the broadcast NBRR may be used to carry NB-PMCH 229, and/or NB-eNB 102 may use the broadcast NBRR for transmission of NB multicast messages 215. The embodiments are not limited to these examples.

In various embodiments, NB cell 103 may implement both a primary NBRR and a broadcast NBRR. In some such embodiments, the primary NBRR may be used to carry NB-SCH 222 and NB-PBCH 224, and the broadcast NBRR may be used to carry most or all of the remaining broadcasted information of NB cell 103. In various other embodiments in which NB cell 103 implements both a primary NBRR and a broadcast NBRR, the primary NBRR may be used to carry NB-SCH 222, while the broadcast NBRR may be used to carry NB-PBCH 224, as well as most or all of the remaining broadcasted information of NB cell 103. In some embodiments, NB cell 103 may implement a broadcast NBRR but not a primary NBRR. In various such embodiments, information to be conveyed via NB-SCH 222 may be transmitted over each NBRR, and the broadcast NBRR may be used to carry NB-PBCH 224, as well as most or all of the remaining broadcasted information of NB cell 103. In some embodiments, information to be conveyed via NB-PBCH 224 may also be transmitted over each NBRR. The embodiments are not limited in this context.

In various embodiments, a particular NBRR to be used as the broadcast NBRR may be statically defined. For example, some embodiments, wireless communications in NB cell 103 may be implemented according to a wireless communication protocol that statically defines a particular NBRR as the broadcast NBRR. In another example, various embodiments, a particular NBRR to be used as the broadcast NBRR may be statically defined in conjunction with initial configuration of NB cell 103. In some other embodiments, the identity of the broadcast NBRR may be semi-statically or dynamically configurable. In various such embodiments, in order to notify devices in NB cell 103 of the identity of the broadcast NBRR, NB-eNB 102 may include an indication of the frequency location of the broadcast NBRR in information that it broadcasts via another NBRR, such as a primary NBRR. In some embodiments, NB-eNB 102 may include an indication of the frequency location of the broadcast NBRR in master information blocks that it transmits in NB cell 103, such as NB-MIBs 208. In various embodiments, the frequency location of the broadcast NBRR may change over time according to a frequency-hopping scheme. In some such embodiments, NB-eNB 102 may broadcast information identifying the frequency-hopping scheme via another NBRR, such as a primary NBRR. In various embodiments, NB-eNB 102 may include information identifying the frequency-hopping scheme in master information blocks that it transmits in NB cell 103, such as NB-MIBs 208. The embodiments are not limited in this context.

In various embodiments, an AIRUS implemented for NB cell 103 in operating environment 200 may define multiple types of broadcast NBRR usage roles. For example, in some embodiments, a system information (SI) broadcast NBRR may be designated for carrying system information such as NB-MIBs 208 and/or NB-SIBs 210, and a paging message NBRR may be designated for carrying paging messages such as NB paging messages 214. In another example, in various embodiments, a mobility SI broadcast NBRR may be designated for carrying system information related to mobility events/operations, and a cell-related SI broadcast NBRR may be designated for carrying other system information. The embodiments are not limited to these examples.

In some embodiments, NB-UE 104 may be configured so that when it is operating in a radio resource control (RRC) idle mode, it periodically checks a broadcast NBRR of NB cell 103 to check for system information updates and/or NB paging messages 214. In various embodiments, for example, while operating in the RRC idle (RRC_IDLE) mode, NB-UE 104 may check the broadcast NBRR according to a paging discontinuous reception (DRX) cycle or an extended DRX cycle. In some embodiments, NB-UE 104 may be configured to determine whether a system information update has occurred by checking for a system information update indication within a system information message—such as, for example, an NB-MIB 208 or NB-SIB 210—received via the broadcast NBRR. In various embodiments, NB-eNB 102 may be operative to notify NB-UE 104 of a system information update by including a system information update indication in a NB paging message 214 transmitted via the broadcast NBRR. The embodiments are not limited to these examples.

In some embodiments, NB-UE 104 may be operative to access a broadcast NBRR to obtain system information while operating in an RRC connected (RRC_CONNECTED) mode. In various such embodiments, NB-UE 104 may be operative to access the broadcast NBRR to obtain system information while operating in the RRC_CONNECTED mode using a paging DRX cycle or an extended DRX cycle. In some embodiments, while operating in the RRC_CONNECTED mode, NB-UE 104 may be operative to access the broadcast NBRR to obtain system information upon expiration of the validity of system information currently stored at NB-UE 104. In various embodiments, while operating in the RRC_CONNECTED mode, NB-UE 104 may be operative to access the broadcast NBRR to obtain system information in response to a system information update indication received from NB-eNB 102. In some such embodiments, NB-eNB 102 may provide the system information update indication via broadcast signaling. In various other such embodiments, NB-eNB 102 may provide the system information update indication via dedicated signaling. The embodiments are not limited in this context.

In some embodiments, at a given point in time, an NB-UE such as NB-UE 104 may operate in the RRC_CONNECTED mode with its radio tuned to receive a standard NBRR. In various such embodiments, NB-UE 104 may be operate in the RRC_CONNECTED mode using a paging DRX cycle or an extended DRX cycle. As employed herein, the term "standard NBRR" is employed to denote an NBRR that is not designated for use as a broadcast NBRR or primary NBRR. The term "active NBRR" is employed to denote—with respect to a given NB-UE—an NBRR that the NB-UE is tuned to receive at a given point in time. In some embodiments, NB-eNB 102 may be configured to transmit a broadcast NBRR information notification 238 to an NB-UE via a standard NBRR to which the NB-UE is tuned in order to notify the NB-UE that it needs to retune to the broadcast NBRR. In various embodiments, such an NB-UE may thus be able to remain tuned to active NBRR as long as it does not receive a broadcast NBRR information notification 238 via that active NBRR, rather than having to periodically retune to a broadcast NBRR. In some embodiments, broadcast NBRR information notifications 238 that NB-eNB 102 transmits over such standard NBRRs may be provided in the form of broadcast signaling, dedicated signaling, or a combination of both. In various embodiments, NB-UEs may be required, upon receipt of such broadcast NBRR information notifications 238, to check the broadcast NBRR at/by a particular point in time relative to the times of receipt of such notifications, such as upon a next subframe or frame, or any time up to the start of a next frame. In some embodiments, similar timing requirements may apply with respect to the times at which such NB-UEs start using/applying updated information obtained in such fashion from the broadcast NBRR. The embodiments are not limited in this context.

In various embodiments, broadcast NBRR information notifications 238 may be implemented in the form of unicast signaling over a DL NB physical channel that carries DL unicast control transmissions. In some embodiments, for example, NB-eNB 102 may send a broadcast NBRR information notification 238 to NB-UE 104 in the form of unicast signaling over NB-PDCCH 226 or another defined NB physical channel for DL unicast control transmission, via the active NBRR of NB-UE 104. In various such embodiments, the broadcast NBRR information notification 238 may be comprised in NB-DCI 216 that NB-eNB 102 transmits in UE-specific search space of NB-PDCCH 226 or the other defined NB physical channel for DL unicast control transmission. The embodiments are not limited in this context.

In some embodiments, broadcast NBRR information notifications 238 may be implemented in the form of broadcast signaling over a DL NB physical channel that carries DL broadcast control transmissions. In various embodiments, for example, NB-eNB 102 may send a broadcast NBRR information notification 238 to NB-UE 104 in the form of broadcast signaling over NB-PDCCH 226 or another defined NB physical channel for DL broadcast control transmission, via the active NBRR of NB-UE 104. In some such embodiments, the broadcast NBRR information notification 238 may be comprised in NB-DCI 216 that NB-eNB 102 transmits in common search space of NB-PDCCH 226 or the other defined NB physical channel for DL broadcast control transmission. The embodiments are not limited in this context.

In various embodiments, broadcast NBRR information notifications 238 may be implemented in the form of unicast signaling over a DL NB physical channel that carries DL unicast data transmissions. In some embodiments, for example, NB-eNB 102 may send a broadcast NBRR information notification 238 to NB-UE 104 in the form of unicast signaling over NB-PDSCH 228 or another defined NB physical channel for DL unicast data transmission, via the active NBRR of NB-UE 104. In various such embodiments, the broadcast NBRR information notification 238 may be comprised in NB-RRC signaling that NB-eNB 102 transmits over NB-PDSCH 228 or the other defined NB physical channel for DL unicast data transmission. The embodiments are not limited in this context.

In some embodiments, broadcast NBRR information notifications 238 may be implemented by extending, modifying, or repurposing a legacy LTE parameter or message. In various other embodiments, a parameter or message may be newly defined for use to implement broadcast NBRR information notifications 238. It is worthy of note that in some embodiments, broadcast NBRR information notifications 238 may be implemented in conjunction with an approach applicable to NB-UEs operating in connected DRX mode, such that when an NB-UE using DRX wakes up on the "ON" duration to monitor NB-PDCCH 226, the NB-UE may receive a broadcast NBRR information notification 238. It is also worthy of note that the embodiments are not limited to implementations that use particular DRX cycles, and that the disclosed techniques may be implemented in conjunction with any type(s) of DRX cycles, such as short DRX cycles, long DRX cycles, extended DRX cycles, and/or one or more newly-defined types of DRX cycles. The embodiments are not limited in this context.

In various embodiments, NB-UE 104 may be configured to monitor a broadcast NBRR while in RRC_CONNECTED mode and connected DRX mode. In some embodiments, NB-UE 104 may monitor the broadcast NBRR to check a common NB-PDCCH. In various such embodiments, in addition to checking the common NB-PDCCH, NB-UE 104 may also access system information sent over the broadcast NBRR to check for system information updates. In some other such embodiments, NB-UE 104 may be notified of system information updates using a dedicated or broadcasted indication. In various embodiments, such a dedicated or broadcasted indication may comprise a broadcast NBRR information notification 238 or a similar type of notification. The embodiments are not limited in this context.

In some embodiments, in lieu of or in addition to the aforementioned approaches, a set of system information may be transmitted over each standard NBRR of NB cell 103. In various embodiments, no broadcast NBRR may be implemented, and all of the system information of NB cell 103 may be transmitted in duplicate fashion over each standard NBRR of NB cell 103. In some embodiments, a broadcast NBRR may be used to carry common configuration information generally applicable to all standard NBRRs, and each standard NBRR may be used to carry system information specific to that standard NBRR. In various embodiments, a same particular subset of the system information of NB cell 103 may be sent over each standard NBRR, in order to enable independent operation of those various NBRRs, potentially at the cost of higher signaling overhead at the system level. The embodiments are not limited in this context.

As noted above, in some embodiments, system information and NB paging messages 214 may be sent via a same broadcast NBRR, while in various other embodiments, a different paging message NBRR may be implemented to carry NB paging messages 214. A number of approaches are possible with respect to the timings of NB paging message transmissions in embodiments in which NB paging messages 214 are carried by a broadcast NBRR, some or all of which may also potentially be applicable to NB-RARs 212 in some embodiments.

In various embodiments, each DL radio frame may use different DL subframes for different kinds of broadcasted information (e.g. NB paging messages 214 vs. system information, or NB paging messages 214 vs. NB-RARs 212). In some embodiments, each DL subframe may use different subframe indices for different kinds of broadcasted information (e.g. NB paging messages 214 vs. system information, or NB paging messages 214 vs. NB-RARs 212). In various embodiments, a narrowband transport block (NB-TB) may be defined that is smaller than a legacy LTE transport block. In some embodiments, such an NB-TB may occupy only a contiguous subset of the subcarriers within a given NBRR. In various embodiments, the reduced size of the NB-TB may enable the transmission of multiple NB-TBs in parallel over a NB-PDSCH 228 that is mapped across the twelve subcarriers of a given NBRR. In some such embodiments, this capability may be used to transmit different types of broadcast information (e.g. NB paging messages 214 vs. system information, or NB paging messages 214 vs. NB-RARs 212) in parallel using a same NBRR. In various embodiments, the time required to transmit given broadcast information according to this approach may be greater than that required to transmit that broadcast information using legacy LTE transport blocks, due to fewer subcarriers being used. The embodiments are not limited in this context.

In some embodiments, rather than being mapped across all twelve subcarriers of an NBRR and being used to carry multiple NB-TBs in parallel, a NB-PDSCH 228 may be mapped to only a subset of the subcarriers of the NBRR. In various such embodiments, the NB-PDSCH 228 may carry a legacy LTE transport block using resources of multiple LTE subframes or even M-subframes. In some embodiments, this approach may avoid potential effects of segmentation that may be necessitated by implementation of an NB-TB, such as increased header and CRC overhead and reduced coding gains. The embodiments are not limited in this context.

In various embodiments, multiple types of NB-SIBs 210 may be defined. In some embodiments, each such type NB-SIBs 210 may be associated with one of multiple defined functional groups of NB-SIB types, in analogous fashion to legacy LTE SIBs. In various embodiments, each type of NB-SIB 210 may be sent within its own RRC system information message. In some other embodiments, a given RRC system information message may contain multiple types of NB-SIBs 210. In various embodiments, only a single type of NB-SIB 210 may be defined. The embodiments are not limited in this context.

In some embodiments, the time/frequency locations of some or all types of NB-SIBs 210 may be statically defined or pre-configured, such that NB-SIBs 210 of those type(s) are transmitted without associated dynamic scheduling such as L1 scheduling via NB-PDCCH 226. In various embodiments, transmitting such type(s) of NB-SIBs 210 without associated dynamic scheduling may necessitate that NB-UEs in NB cell 103 be provided (such as via pre-configuration or via information contained in an NB-MIB 208 or a fundamental type of NB-SIB 210 such as an NB-SIB1) with knowledge of the time/frequency locations of those type(s) of NB-SIBs 210. In some embodiments, with respect to one or more types of NB-SIBs 210, an MCS, TB size, and/or number of repetitions may be statically defined. In various other embodiments, the MCS, TB size, and/or number of repetitions may be configurable, and NB-PBCH 224 may be used to broadcast information identifying a particular NB-SIB scheduling configuration from among a plurality of possible configurations. In some embodiments, the time/frequency locations of some or all types of NB-SIBs 210 may be scheduled. In various such embodiments, NB-PBCH 224 and/or a fundamental type of NB-SIB 210 such as an NB-SIB1 may be used to provide NB-UEs in NB cell 103 with NB-SIB-related scheduling information, which may indicate information such as time/frequency resources, an MCS, a TB size, and/or a number of repetitions. The embodiments are not limited in this context.

In some embodiments, NB-eNB 102 may determine one or more characteristics of its NB-RAR transmissions based on the UE RACH preamble configuration, resources, number of repetitions and/or NBRR used. In various embodiments, such characteristics may include time/frequency locations, numbers of repetitions, and/or the time relation between the UL RACH preamble transmission and the DL RAR message or the instant when to start expecting the potential message (RAR window). The embodiments are not limited to these examples.

In some embodiments, NB-eNB 102 may be operative to transmit NB-RARs 212 without associated dynamic DL assignment DCI. In various such embodiments, NB-RARs 212 may be transmitted directly using NB-PDCCH 226 by defining new DCI to carry NB-RARs 212. In some embodiments, one DCI, two DCIs, or more than two DCIs may be defined to map to NB-RAR addressing one, two, or more than two NB-UEs. In various embodiments, NB-UEs in NB cell 103 may monitor a common search space (CSS) of NB-PDCCH 226 for DCI comprising NB-RARs 212. In some other embodiments, NB-RARs 212 may be scheduled for transmission over NB-PDSCH 228, and scheduling information for such scheduled transmissions may be provided via NB-PDCCH 226. In various such embodiments, NB-UEs in NB cell 103 may monitor a CSS of NB-PDCCH 226 for scheduling assignments associated with scheduled transmissions of NB-RARs 212. The embodiments are not limited in this context.

In some embodiments, in conjunction with either scheduled or unscheduled NB-RAR transmissions, NB-UEs in NB cell 103 may be configured to monitor an NB-RAR CSS of NB-PDCCH 226 during an RAR window. In various embodiments, the RAR window during which NB-UE 104 monitors the NB-RAR CSS of NB-PDCCH 226 may be defined in relation to the timing of a NB random access request 218 transmission over NB-PRACH 230 on the part of NB-UE 104. In some embodiments, a time span for the NB-RAR CSS may be indicated implicitly by following the RAR window. In various embodiments, a DL NBRR to be used for monitoring an NB-RAR CSS may be implicitly mapped to a DL NBRR that is NB-SIB1-linked to a UL NBRR via which a NB random access request 218 was transmitted over NB-PRACH 230. In some embodiments, a DL NBRR to be used for monitoring an NB-RAR CSS may be defined as a function of the UL NBRR used to transmit the NB random access request 218 over NB-PRACH 230, the NB-PRACH preamble sequence, and the number of DL NBRRs available for use to carry NB-RAR CSSs. In various embodiments, the number of DL NBRRs to which NB-RAR CSSs are mapped may be same as the total number of DL NBRRs available in the system. In some other embodiments, NB-RAR CSSs may be mapped only to an indicated subset of the available DL NBRRs. In various embodiments, using only a subset of the available DL NBRRs to carry NB-RAR CSSs may provide some flexibility to avoid NB-RAR collisions between NB-UEs that may potentially transmit different NB-PRACH preamble sequences on the same NB-PRACH time-frequency physical resources. In some embodiments, different NB-UEs or groups of NB-UEs may monitor different NB-RAR CSSs depending on their NB-RACH transmissions. The embodiments are not limited in this context.

In various embodiments, in order to correctly conduct paging operations with respect to NB-UE 104, NB-eNB 102 may need to know that NB-UE 104 may operate using an NBRR, such that an NB-paging transmission mechanism may need to be used in conjunction with paging NB-UE 104. In some embodiments, a multimedia mobility entity (MME) may notify NB-eNB 102 of this possibility by indicating it in information included in an S1-AP paging message sent to NB-eNB 102. In various embodiments, the MME may store and share other information relevant to NB-eNB 102's paging of NB-UE 104, such as an identity of an NBRR that NB-UE 104 monitors for NB paging messages 214. In some such embodiments, a broadcast paging channel may be defined within each NBRR. In various other embodiments, as previously discussed, NB-eNB 102 may transmit NB paging messages 214 for NB-UE 104 over a broadcast NBRR, or some other NBRR that is designated to carry paging messages for all NB-UEs in NB cell 103. The embodiments are not limited in this context.

In some embodiments, NB-UE 104 may be configured to monitor a defined NB-Paging CSS only during paging occasions (POs). In various embodiments, such POs may be defined in terms of M-subframes. In some embodiments, NB paging messages 214 may be transmitted in certain specified DL subframes. For example, in various embodiments, NB paging messages 214 may be transmitted in the same DL subframes—DL subframes 0, 4, 5, and 9—as are paging messages in legacy LTE FDD systems. In some other embodiments, NB-eNB 102 may be permitted to transmit NB paging messages 214 during any DL subframe that may carry NB-PDCCH 226. The embodiments are not limited in this context.

In various embodiments, NB paging messages 214 may be transmitted directly on NB-PDCCH 226 by defining new DCI(s) to carry NB paging messages 214. In some embodiments, a given defined DCI may be addressable to multiple NB-UEs. In various embodiments, one DCI may be defined to carry NB paging messages 214 directed to RRC_IDLE mode NB-UEs (such as NB paging messages 214 triggered by mobile-terminated traffic), and another DCI may be defined to carry NB paging messages 214 directed to RRC_CONNECTED mode NB-UEs (such as NB paging messages 214 indicating system information updates). In some embodiments, NB-UEs in NB cell 103 may be required to blindly decode the different possible DCIs on the NB-Paging CSS to monitor and decode NB paging messages 214. In various embodiments, in order to reduce the amount of DCI that NB-UEs in NB cell 103 must monitor in order to enable receipt of NB paging messages 214, different respective NB-Paging CSSs may be defined for NB paging messages 214 directed to RRC_IDLE mode NB-UEs and NB paging messages 214 directed to RRC_CONNECTED mode NB-UEs. In some other embodiments, NB paging messages 214 may be scheduled for transmission over NB-PDSCH 228, and scheduling information for such scheduled transmissions may be provided via NB-PDCCH 226. In various such embodiments, NB-UEs in NB cell 103 may monitor a CSS of NB-PDCCH 226 for scheduling assignments associated with scheduled transmissions of NB paging messages 214. The embodiments are not limited in this context.

In some embodiments, different NB-UEs in NB cell 103 may monitor different DL NBRRs for NB paging messages 214. In various embodiments, a mapping may be defined between NB-Paging CSSs and DL NBRRs on which those NB-Paging CSSs are to be monitored. In some embodiments, an NB-Paging CSS of a given NB-UE may map to a DL NBRR as a function of the UE-ID and the number of DL NBRRs available for use to carry NB-Paging CSSs. In various embodiments, the number of DL NBRRs to which NB-Paging CSSs are mapped may be same as the total number of DL NBRRs available in the system. In some other embodiments, NB-Paging CSSs may be mapped only to an indicated subset of the available DL NBRRs. The embodiments are not limited in this context.

In some embodiments, NB-eNB 102 may generally be operative to map DL physical channels of NB cell 103 to NBRRs of NB cell 103 according to a DL RE mapping scheme. In various embodiments, the DL RE mapping scheme may define a channel mapping algorithm for use by NB-eNB 102 in conjunction with NB-PDCCH transmissions and/or NB-PDSCH transmissions. In some embodiments, NB-eNB 102 may use such a channel mapping algorithm to identify—with respect to a given NBRR—REs to which to map NB-PDCCH symbols and/or NB-PDSCH symbols. In various embodiments, NB-UE 104 may use a corresponding channel reception algorithm to identify—with respect to the given NBRR—REs that comprise NB-PDCCH symbols and/or REs that comprise NB-PDSCH symbols.

In some embodiments in which NB cell 103 uses one or more particular NBRRs (such as a primary NBRR) for NB-PSS/SSS and/or NB-PBCH transmissions and does not use one or more other NBRRs for such transmissions, NB-eNB 102 may be configured to use a channel mapping algorithm according to which it maps NB-PDCCH symbols and/or NB-PDSCH symbols to REs of such other NBRRs without providing accommodation for NB-PSS/SSS and/or NB-PBCH transmissions via those other NBRRs. In various embodiments, NB-UE 104 may be configured to use a channel reception algorithm according to which it does not perform rate-matching to account for NB-PSS/SSS REs and/or NB-PBCH REs when extracting NB-PDCCH symbols and/or NB-PDSCH symbols from REs of an NBRR that it does not know to be used for NB-PSS/SSS and/or NB-PBCH transmissions. According to the channel reception algorithm in such embodiments, with respect to a given NBRR that it knows to be used for NB-PSS/SSS and NB-PBCH transmissions, NB-UE 104 may perform rate-matching to account for NB-PSS/SSS REs and/or NB-PBCH REs.

In some embodiments, the particular NBRR(s) to be used for NB-PSS/SSS and/or NB-PBCH transmissions may be statically defined. For example, various embodiments, wireless communications in NB cell 103 may be implemented according to a wireless communication protocol that statically defines a particular set of one or more NBRRs that are to be used for NB-PSS/SSS and/or NB-PBCH transmissions. In another example, some embodiments, a particular set of one or more NBRRs to be used for NB-PSS/SSS and/or NB-PBCH transmissions may be statically defined in conjunction with initial configuration of NB cell 103. In various other embodiments, the particular NBRR(s) to be used for NB-PSS/SSS and/or NB-PBCH transmissions may be semi-statically or dynamically configurable. In some embodiments, NB-eNB 102 may be configured to broadcast information identifying the particular NBRR(s) to be used for NB-PSS/SSS and/or NB-PBCH transmissions. In various embodiments, NB-eNB 102 may be configured to include information identifying such particular NBRR(s) in NB-MIBs 208 that it transmits in NB cell 103. The embodiments are not limited in this context.

In some embodiments, a set of multiple NBRRs that may potentially be used for NB-PSS/SSS and/or NB-PBCH transmissions may be statically defined. For example, various embodiments, wireless communications in NB cell 103 may be implemented according to a wireless communication protocol that statically defines a particular set of multiple NBRRs that may potentially be used for NB-PSS/SSS and/or NB-PBCH transmissions. In another example, some embodiments, a particular set of multiple NBRRs that may potentially be used for NB-PSS/SSS and/or NB-PBCH transmissions may be statically defined in conjunction with initial configuration of NB cell 103. In various embodiments, with respect to the multiple NBRRs of the defined set, the particular NBRR(s) to be used for NB-PSS/SSS and/or NB-PBCH transmissions may be semi-statically or dynamically configurable. In some embodiments, NB-eNB 102 may be configured to broadcast information identifying—among the multiple NBRRs of the defined set—the particular NBRR(s) to be used for NB-PSS/SSS and/or NB-PBCH transmissions. In various embodiments, NB-eNB 102 may be configured to include such information in NB-MIBs 208 that it transmits in NB cell 103. In some embodiments, NB-eNB 102 may be configured—with respect to NB-PSS/SSS and/or NB-PBCH transmissions—to either use only a particular one of the multiple NBRRs or use all of the multiple NBRRs. In various such embodiments, NB-eNB 102 may be configured to indicate whether it is using only the particular one of the multiple NBRRs or all of the multiple NBRRs by setting a value of a bit comprised in NB-MIBs 208 that it transmits in NB cell 103. The embodiments are not limited in this context.

In some embodiments, NB-eNB 102 may be configured to use NB-PBCH signaling to provide devices in NB cell 103 with information indicating, with respect to one or more NBRRs, whether rate-matching should be implemented in order to account for NB-PSS/SSS and/or NB-PBCH REs. In various such embodiments, NB-eNB 102 may be able to set a one bit field in an NB-MIB 208 in order to indicate that for all other NBRRs (or for all NBRRs other than those carrying NB-PSS/SSS and/or NB-PBCH transmissions), NB-PDCCH symbols and/or NB-PDSCH symbols are mapped to REs without providing accommodation for NB-PSS/SSS and/or NB-PBCH transmissions. The embodiments are not limited in this context.

In some embodiments, NB-eNB 102 may be configured to use system information block (SIB) signaling to provide devices in NB cell 103 with information indicating, with respect to one or more NBRRs, whether rate-matching should be implemented in order to account for NB-PSS/SSS and/or NB-PBCH REs. In various embodiments, NB-eNB 102 may include such information in an NB-SIB 210 that it transmits over an NBRR that it does not use for NB-PSS/SSS and/or NB-PBCH transmissions. In some embodiments, NB-eNB 102 may include such information in an NB-SIB 210 that it transmits over an NBRR that it also uses for NB-PSS/SSS and/or NB-PBCH transmissions. In various such embodiments, the information included in the NB-SIB 210 may indicate, for each other NBRR of NB cell 103, whether accommodation for NB-PSS/SSS and/or NB-PBCH transmissions is provided in conjunction with mapping NB-PDCCH symbols and/or NB-PDSCH symbols to REs of that NBRR. The embodiments are not limited in this context.

In some embodiments in which NB-eNB 102 implements an SIB signaling approach to symbol-to-RE mapping with respect to NB-PDCCH symbols and/or NB-PDSCH symbols, an SIB used for such signaling may always be transmitted via a same NBRR as is used for NB-PSS/SSS and/or NB-PBCH transmissions. In various such embodiments, NB-eNB 102 may be operative to use the SIB signaling to provide NB-UEs such as NB-UE 104 with an indication of whether the RE mapping for NB-PDCCH and/or NB-PDSCH transmissions over other configured NBRRs does or does not consider the presence of NB-PSS/NB-SSS and/or NB-PBCH REs. In some such embodiments, NB-UE 104 may be operative use information comprised in an NB-SIB 210 to determine whether to perform rate-matching around NB-PSS/NB-SSS and/or NB-PBCH locations when receiving NB-PDCCH and/or NB-PDSCH transmissions via any of the other configured NBRRs.

In various embodiments in which NB-eNB 102 implements an SIB signaling approach to symbol-to-RE mapping with respect to NB-PDCCH symbols and/or NB-PDSCH symbols, an SIB used for such signaling may or may not be one that is transmitted via a same NBRR as is used for NB-PSS/SSS and/or NB-PBCH transmissions. In some embodiments, NB-UE 104 may be configured to assume, with respect to the NBRR via which it receives the relevant SIB, that NB-PDCCH and/or NB-PDSCH transmissions are always rate-matched around NB-PSS/NB-SSS and/or NB-PBCH locations, or that PSS/NB-SSS and/or NB-PBCH REs always puncture NB-PDCCH and/or NB-PDSCH REs. In various embodiments, NB-eNB 102 may be operative to use the SIB signaling to provide NB-UE 104 with information indicating—with respect to NBRRs other than the NBRR providing the relevant SIB and one, some, or all of the NBRR(s) used for NB-PSS/NB-SSS and/or NB-PBCH transmissions (if such NBRR(s) are known to NB-UE 104)—whether the RE mapping for NB-PDCCH and/or NB-PDSCH transmissions does or does not provide accommodation for NB-PSS/NB-SSS REs and/or NB-PBCH REs. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
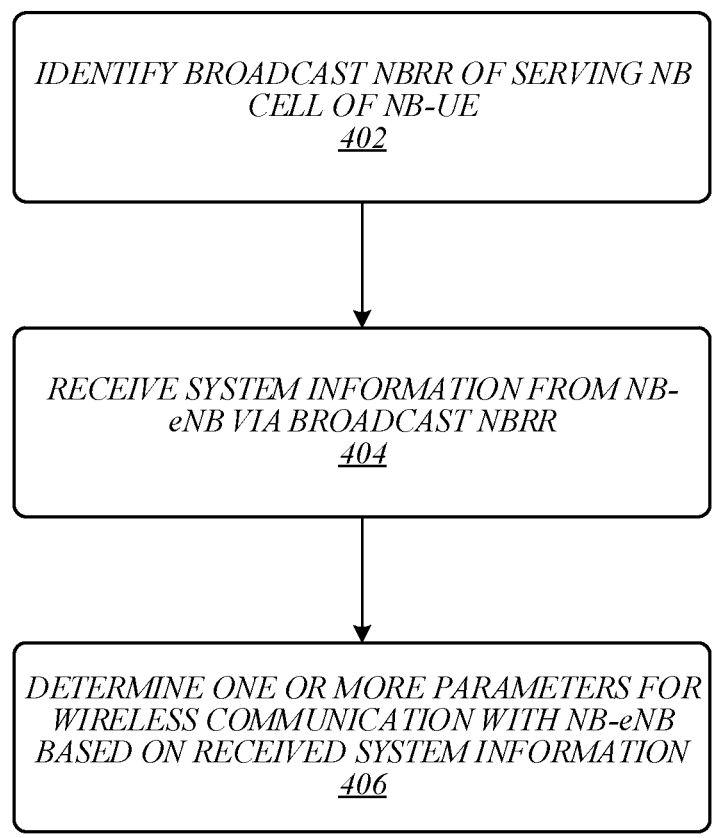
FIG. 4 illustrates an embodiment of a first logic flow.

FIG. 4 illustrates an example of a logic flow 400 that may be representative of one or more of the disclosed air interface resource utilization techniques for wireless communication networks according to various embodiments. For example, logic flow 400 may be representative of operations that may be performed by NB-UE 104 in operating environment 200 of FIG. 2 according to some embodiments. As shown in FIG. 4, a broadcast NBRR of a serving NB cell of an NB-UE may be identified at 402. For example, in operating environment 200 of FIG. 2, NB-UE 104 may be operative to a broadcast NBRR of NB cell 103. At 404, system information may be received from an NB-eNB via the broadcast NBRR. For example, in operating environment 200 of FIG. 2, NB-UE 104 may be operative to receive system information from NB-eNB 102 via a broadcast NBRR of NB cell 103. At 406, one or more parameters for wireless communication with the NB-eNB may be determined based on the received system information. For example, in operating environment 200 of FIG. 2, NB-UE 104 may be operative to determine one or more parameters for wireless communication with NB-eNB 102 based on system information received from NB-eNB 102 via a broadcast NBRR of NB cell 103. The embodiments are not limited to these examples.

Figure 5:
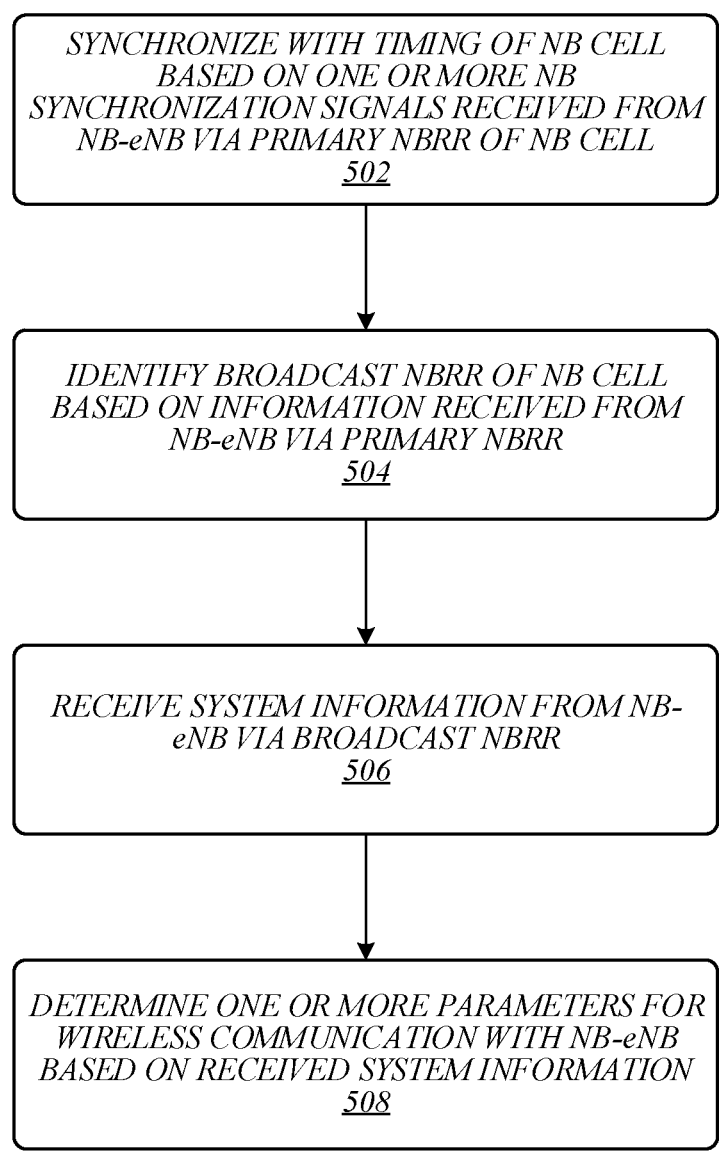
FIG. 5 illustrates an embodiment of a second logic flow.

FIG. 5 illustrates an example of a logic flow 500 that may be representative of one or more of the disclosed air interface resource utilization techniques for wireless communication networks according to various embodiments. For example, logic flow 500 may be representative of operations that may be performed by NB-UE 104 in operating environment 200 of FIG. 2 according to some embodiments. As shown in FIG. 5, synchronization with a timing of an NB cell may be performed at 502 based on one or more NB synchronization signals received from an NB-eNB via a primary NBRR of the NB cell. For example, in operating environment 200 of FIG. 2, NB-UE 104 may be operative to synchronize with a timing of NB cell 103 based on NB PSSs/SSSs 206 received from NB-eNB 102 via a primary NBRR of NB cell 103.

At 504, a broadcast NBRR of the NB cell may be identified based on information received from the NB-eNB via the primary NBRR. For example, in operating environment 200 of FIG. 2, NB-UE 104 may be operative to identify a broadcast NBRR of NB cell 103 based on information received from NB-eNB 102 via a primary NBRR of NB cell 103. At 506, system information may be received from the NB-eNB via the broadcast NBRR. For example, in operating environment 200 of FIG. 2, NB-UE 104 may be operative to receive system information from NB-eNB 102 via a broadcast NBRR of NB cell 103. At 508, one or more parameters for wireless communication with the NB-eNB may be determined based on the received system information. For example, in operating environment 200 of FIG. 2, NB-UE 104 may be operative to determine one or more parameters for wireless communication with NB-eNB 102 based on system information received from NB-eNB 102 via a broadcast NBRR of NB cell 103. The embodiments are not limited to these examples.

Figure 6:
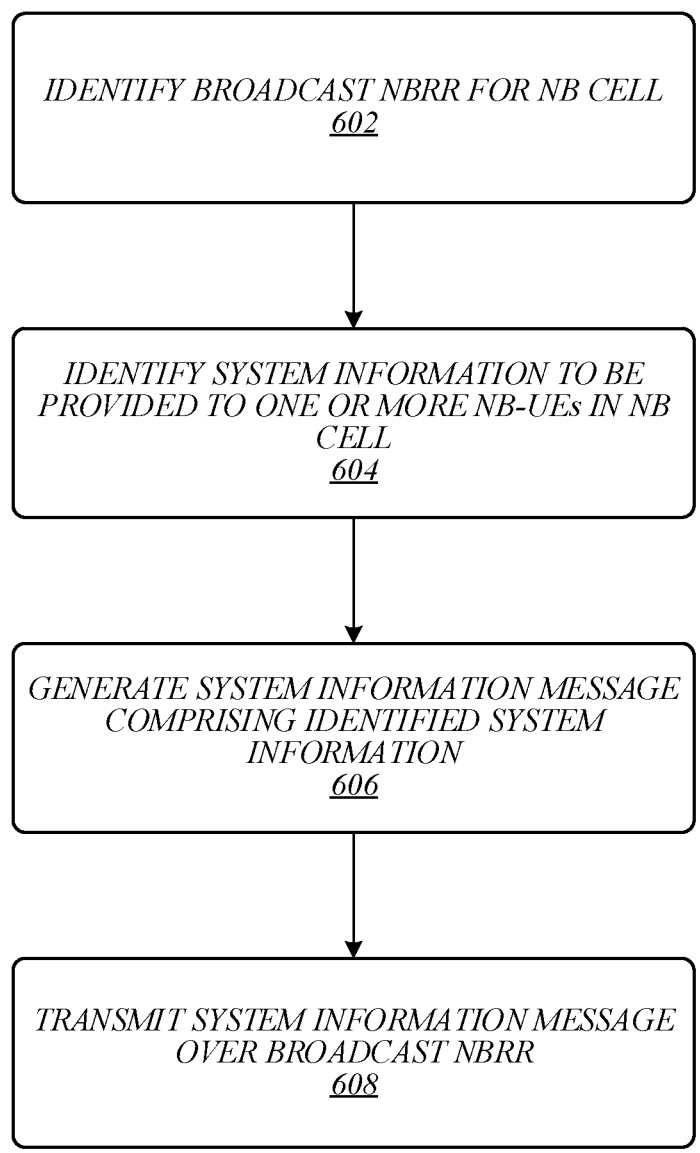
FIG. 6 illustrates an embodiment of a third logic flow.

FIG. 6 illustrates an example of a logic flow 600 that may be representative of one or more of the disclosed air interface resource utilization techniques for wireless communication networks according to various embodiments. For example, logic flow 600 may be representative of operations that may be performed by NB-eNB 102 in operating environment 200 of FIG. 2 according to some embodiments. As shown in FIG. 6, a broadcast NBRR for an NB cell may be identified at 602. For example, in operating environment 200 of FIG. 2, NB-eNB 102 may be operative to identify a broadcast NBRR for NB cell 103. At 604, system information to be provided to one or more NB-UEs in the NB cell may be identified. For example, in operating environment 200 of FIG. 2, NB-eNB 102 may be operative to identify system information to be provided to one or more NB-UEs in NB cell 103. At 606, a system information message may be generated that comprises the identified system information. For example, in operating environment 200 of FIG. 2, NB-eNB 102 may be operative to generate a system information message that comprises the system information identified at 604. At 608, the system information message may be transmitted over the broadcast NBRR. For example, in operating environment 200 of FIG. 2, NB-eNB 102 may be operative to provide system information to one or more NB-UEs in NB cell 103 by including the system information in a system information message that it transmits over a broadcast NBRR of NB cell 103. The embodiments are not limited to these examples.

Figure 7:
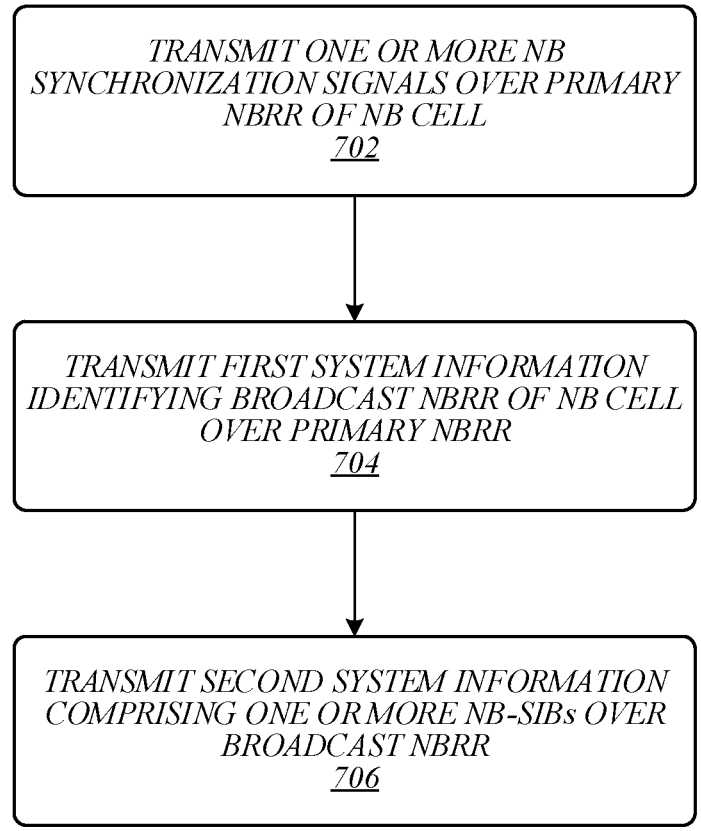
FIG. 7 illustrates an embodiment of a fourth logic flow.

FIG. 7 illustrates an example of a logic flow 700 that may be representative of one or more of the disclosed air interface resource utilization techniques for wireless communication networks according to various embodiments. For example, logic flow 700 may be representative of operations that may be performed by NB-eNB 102 in operating environment 200 of FIG. 2 according to some embodiments. As shown in FIG. 7, one or more NB synchronization signals may be transmitted over a primary NBRR of an NB cell at 702. For example, in operating environment 200 of FIG. 2, NB-eNB 102 may be operative to transmit NB PSSs/SSSs 206 over a primary NBRR of NB cell 103. At 704, first system information identifying a broadcast NBRR of the NB cell may be transmitted over the primary NBRR. For example, in operating environment 200 of FIG. 2, NB-eNB 102 may be operative to transmit first system information identifying a broadcast NBRR of NB cell 103 over a primary NBRR of NB cell 103. At 706, second system information comprising one or more NB-SIBs may be transmitted over the broadcast NBRR. For example, in operating environment 200 of FIG. 2, NB-eNB 102 may be operative to transmit second system information comprising one or more NB-SIBs 210 over a broadcast NBRR of NB cell 103. The embodiments are not limited to these examples.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or both of logic flow 400 of FIG. 4 and logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 8 also illustrates an embodiment of a storage medium 850. Like storage medium 800, storage medium 850 may comprise any non-transitory computer-readable storage medium or machine-readable storage medium, such as an optical, magnetic or semiconductor storage medium. Examples of such a computer-readable storage medium or machine-readable storage medium may include—without limitation—any of the examples mentioned above in reference to storage medium 800. In various embodiments, storage medium 850 may comprise an article of manufacture. In some embodiments, storage medium 850 may store computer-executable instructions, such as computer-executable instructions to implement one or both of logic flow 600 of FIG. 6 and logic flow 700 of FIG. 7. Examples of such computer-executable instructions may include—without limitation—any of the examples mentioned above in reference to storage medium 800. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 9:
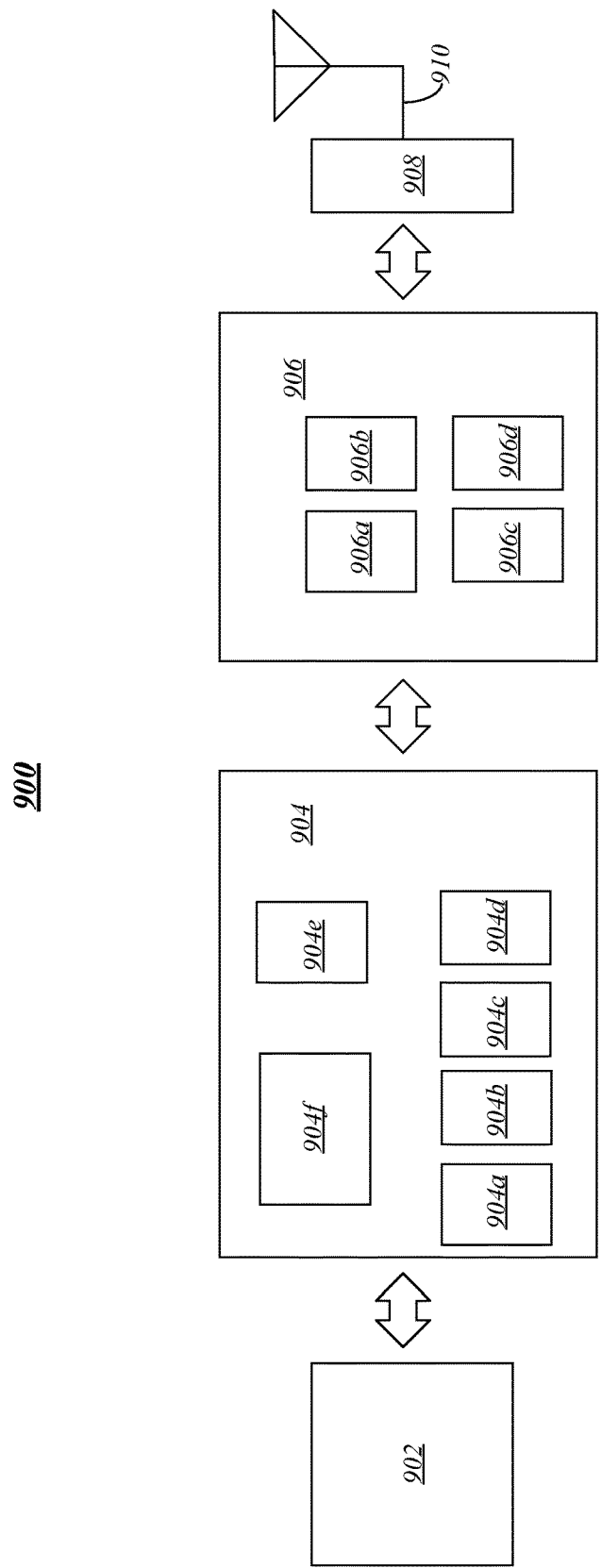
FIG. 9 illustrates an embodiment of user equipment.

FIG. 9 illustrates an example of a UE device 900 that may be representative of a UE that implements one or more of the disclosed air interface resource utilization techniques for wireless communication networks according to various embodiments. For example, UE device 900 may be representative of NB-UE 104 according to some embodiments. In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast- Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display, camera, sensor, and/or input/output (I/O) interface.

Figure 10:
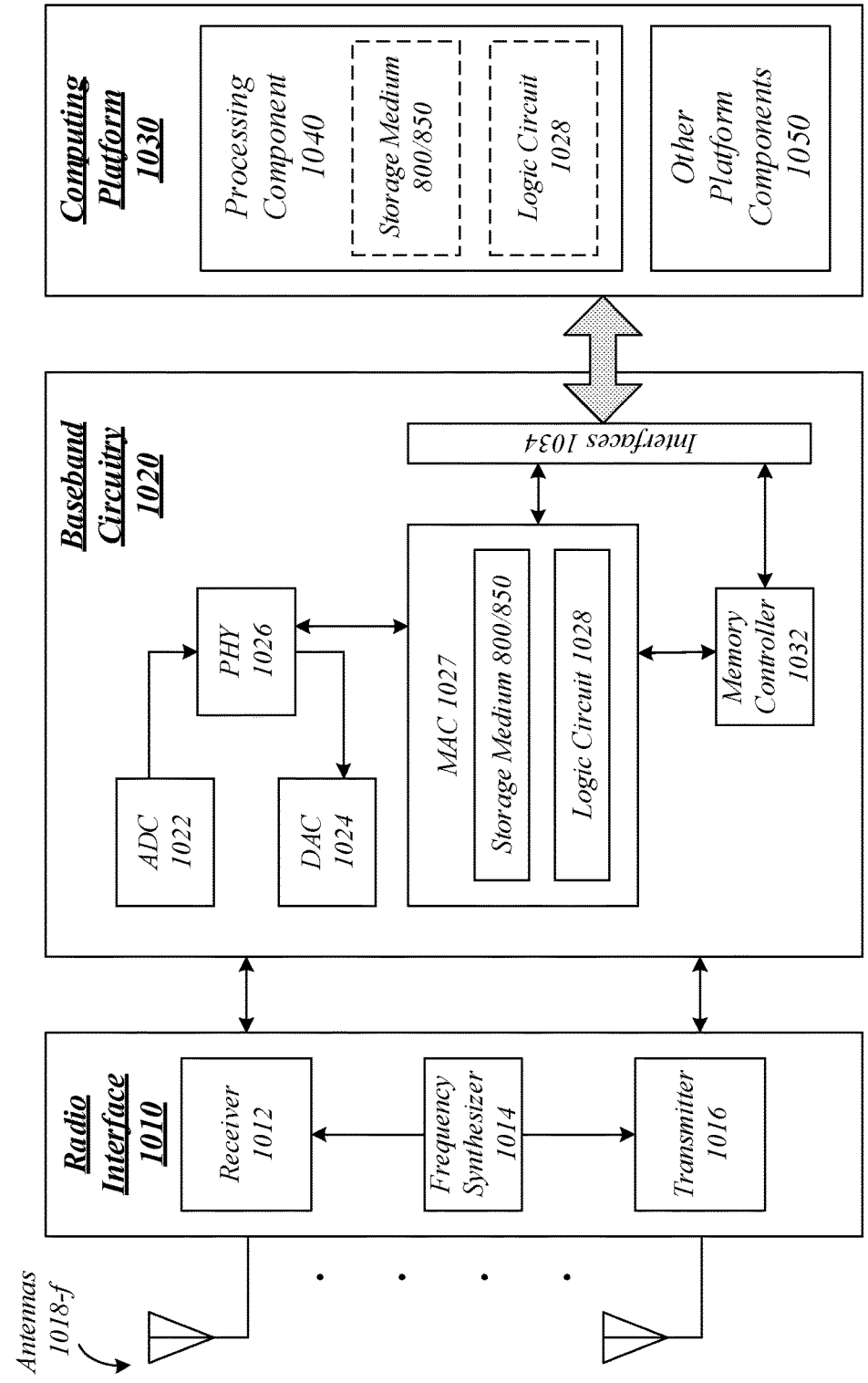
FIG. 10 illustrates an embodiment of a device.

FIG. 10 illustrates an embodiment of a communications device 1000 that may implement one or more of NB-eNB 102, NB-UE 104, logic flow 400, logic flow 500, logic flow 600, logic flow 700, storage medium 800, storage medium 850, and UE 900. In various embodiments, device 1000 may comprise a logic circuit 1028. The logic circuit 1028 may include physical circuits to perform operations described for one or more of NB-eNB 102, NB-UE 104, logic flow 400, logic flow 500, logic flow 600, logic flow 700, and UE 900 for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of NB-eNB 102, NB-UE 104, logic flow 400, logic flow 500, logic flow 600, logic flow 700, storage medium 800, storage medium 850, UE 900, and logic circuit 1028 in a single computing entity, such as entirely within a single device. Alternatively, the device 1000 may distribute portions of the structure and/or operations for one or more of NB-eNB 102, NB-UE 104, logic flow 400, logic flow 500, logic flow 600, logic flow 700, storage medium 800, storage medium 850, UE 900, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, a mixer for down-converting received RF signals, an analog-to-digital converter 1022 for converting analog signals to digital form, a digital-to-analog converter 1024 for converting digital signals to analog form, and a mixer for up-converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of NB-eNB 102, NB-UE 104, logic flow 400, logic flow 500, logic flow 600, logic flow 700, storage medium 800, storage medium 850, UE 900, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
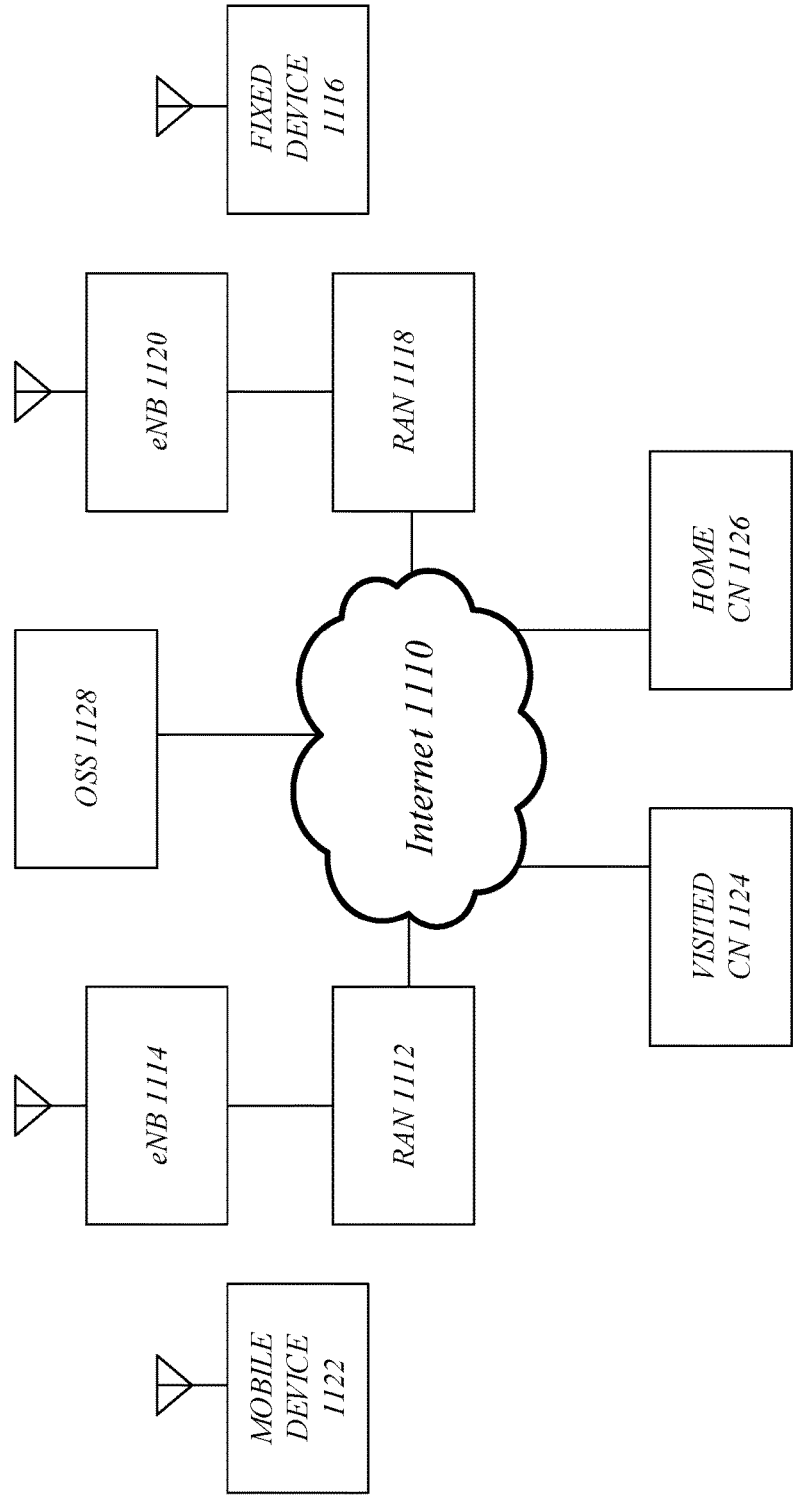
FIG. 11 illustrates an embodiment of a wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic m devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for narrowband user equipment (NB-UE), at least a portion of the logic implemented in circuitry coupled to the memory, the logic to identify a broadcast narrowband resource region (NBRR) of a serving narrowband (NB) cell of the NB-UE, cause the NB-UE to tune to the broadcast NBRR, and determine one or more parameters for wireless communication with an NB-evolved node B (NB-eNB) based on system information received from the NB-eNB via the broadcast NBRR.

Example 2 is the apparatus of Example 1, the broadcast NBRR to comprise a 180 kHz bandwidth or a 200 kHz bandwidth.

Example 3 is the apparatus of any of Examples 1 to 2, the system information received via the broadcast NBRR to include an NB master information block (NB-MIB).

Example 4 is the apparatus of any of Examples 1 to 3, the system information received via the broadcast NBRR to include one or more NB system information blocks (NB-SIBs).

Example 5 is the apparatus of any of Examples 1 to 4, the logic to initiate a transition to a radio resource control (RRC) connected state in response to an NB paging message received from the NB-eNB via the broadcast NBRR.

Example 6 is the apparatus of any of Examples 1 to 5, the logic to identify an uplink (UL) scheduling grant based on an NB random access response (NB-RAR) received from the NB-eNB via the broadcast NBRR.

Example 7 is the apparatus of any of Examples 1 to 6, the logic to cause the NB-UE tune to the broadcast NBRR in response to a received broadcast NBRR information notification.

Example 8 is the apparatus of Example 7, the broadcast NBRR information notification to be received via a standard NBRR of the NB cell.

Example 9 is the apparatus of any of Examples 7 to 8, the broadcast NBRR information notification to be comprised in a received NB radio resource control (RRC) message.

Example 10 is the apparatus of any of Examples 7 to 8, the broadcast NBRR information notification to comprise unicasted downlink control information (DCI).

Example 11 is the apparatus of any of Examples 7 to 8, the broadcast NBRR information notification to comprise broadcasted downlink control information (DCI).

Example 12 is the apparatus of any of Examples 1 to 11, the logic to identify a primary NBRR of the NB cell, cause the NB-UE to tune to the primary NBRR, and determine a frame timing of the NB cell based on one or more synchronization signals received from the NB-eNB via the primary NBRR.

Example 13 is the apparatus of Example 12, the logic to determine one or more parameters for wireless communication with the NB-eNB based on an NB master information block (NB-MIB) received from the NB-eNB via the primary NBRR.

Example 14 is the apparatus of any of Examples 12 to 13, the logic to identify the broadcast NBRR based on information received from the NB-eNB via the primary NBRR.

Example 15 is a system, comprising an apparatus according to any of Examples 1 to 14, and at least one radio frequency (RF) transceiver.

Example 16 is the system of Example 15, comprising at least one processor.

Example 17 is the system of any of Examples 15 to 16, comprising at least one RF antenna.

Example 18 is at least one computer-readable storage medium comprising a set of instructions that, in response to being executed at narrowband user equipment (NB-UE), cause the NB-UE to synchronize with a timing of a narrowband (NB) cell based on one or more NB synchronization signals received from an NB evolved node B (NB-eNB) via a primary NB resource region (NBRR) of the NB cell, identify a broadcast NBRR of the NB cell based on information received from the NB-eNB via the primary NBRR, tune to the broadcast NBRR, and determine one or more parameters for wireless communication with the NB-eNB based on system information received from the NB-eNB via the broadcast NBRR.

Example 19 is the at least one computer-readable storage medium of Example 18, the broadcast NBRR to comprise a 180 kHz bandwidth or a 200 kHz bandwidth.

Example 20 is the at least one computer-readable storage medium of any of Examples 18 to 19, the system information received via the broadcast NBRR to include an NB master information block (NB-MIB).

Example 21 is the at least one computer-readable storage medium of any of Examples 18 to 20, the system information received via the broadcast NBRR to include one or more NB system information blocks (NB-SIBs).

Example 22 is the at least one computer-readable storage medium of any of Examples 18 to 21, comprising instructions that, in response to being executed at the NB-UE, cause the NB-UE to initiate a transition to a radio resource control (RRC) connected state in response to an NB paging message received from the NB-eNB via the broadcast NBRR.

Example 23 is the at least one computer-readable storage medium of any of Examples 18 to 22, comprising instructions that, in response to being executed at the NB-UE, cause the NB-UE to identify an uplink (UL) scheduling grant based on an NB random access response (NB-RAR) received from the NB-eNB via the broadcast NBRR.

Example 24 is the at least one computer-readable storage medium of any of Examples 18 to 23, comprising instructions that, in response to being executed at the NB-UE, cause the NB-UE to tune to the broadcast NBRR in response to a received broadcast NBRR information notification.

Example 25 is the at least one computer-readable storage medium of Example 24, the broadcast NBRR information notification to be received via a standard NBRR of the NB cell.

Example 26 is the at least one computer-readable storage medium of any of Examples 24 to 25, the broadcast NBRR information notification to be comprised in a received NB radio resource control (RRC) message.

Example 27 is the at least one computer-readable storage medium of any of Examples 24 to 25, the broadcast NBRR information notification to comprise unicasted downlink control information (DCI).

Example 28 is the at least one computer-readable storage medium of any of Examples 24 to 25, the broadcast NBRR information notification to comprise broadcasted downlink control information (DCI).

Example 29 is the at least one computer-readable storage medium of any of Examples 18 to 28, comprising instructions that, in response to being executed at the NB-UE, cause the NB-UE to determine one or more parameters for wireless communication with the NB-eNB based on an NB master information block (NB-MIB) received from the NB-eNB via the primary NBRR.

Example 30 is a method, comprising identifying, at a narrowband evolved node B (NB-eNB), a broadcast narrowband resource region (NBRR) for an NB cell, identifying system information to be provided to one or more NB user equipments (NB-UEs) in the NB cell, and transmitting a system information message over the broadcast NBRR, the system information message to comprise the identified system information.

Example 31 is the method of Example 30, the broadcast NBRR to comprise a 180 kHz bandwidth or a 200 kHz bandwidth.

Example 32 is the method of any of Examples 30 to 31, the system information message to comprise an NB master information block (NB-MIB).

Example 33 is the method of any of Examples 30 to 32, the system information message to comprise one or more NB system information blocks (NB-SIBs).

Example 34 is the method of any of Examples 30 to 33, comprising transmitting one or more NB paging messages over the broadcast NBRR.

Example 35 is the method of any of Examples 30 to 34, comprising transmitting one or more NB random access responses (NB-RARs) over the broadcast NBRR.

Example 36 is the method of any of Examples 30 to 35, comprising transmitting a broadcast NBRR information notification to an NB-UE to instruct the NB-UE to tune to the broadcast NBRR.

Example 37 is the method of Example 36, comprising transmitting the broadcast NBRR information notification over a standard NBRR of the NB cell.

Example 38 is the method of any of Examples 36 to 37, the broadcast NBRR information notification to be comprised in an NB radio resource control (RRC) message.

Example 39 is the method of any of Examples 36 to 37, the broadcast NBRR information notification to comprise unicasted downlink control information (DCI).

Example 40 is the method of any of Examples 36 to 37, the broadcast NBRR information notification to comprise broadcasted downlink control information (DCI).

Example 41 is the method of any of Examples 30 to 40, comprising identifying a primary NBRR of the NB cell, and transmitting one or more NB synchronization signals over the primary NBRR.

Example 42 is the method of Example 41, comprising transmitting an NB master information block (NB-MIB) over the primary NBRR.

Example 43 is the method of Example 42, the NB-MIB to comprise information identifying the broadcast NBRR of the NB cell.

Example 44 is at least one computer-readable storage medium comprising a set of instructions that, in response to being executed on a computing device, cause the computing device to perform a method according to any of Examples 30 to 43.

Example 45 is an apparatus, comprising means for performing a method according to any of Examples 30 to 43.

Example 46 is a system, comprising the apparatus of Example 45, and at least one radio frequency (RF) transceiver.

Example 47 is the system of Example 46, comprising at least one processor.

Example 48 is the system of any of Examples 46 to 47, comprising at least one RF antenna.

Example 49 is an apparatus, comprising means for transmitting, from a narrowband evolved node B (NB-eNB), one or more NB synchronization signals over a primary NB resource region (NBRR) of an NB cell, means for transmitting first system information over the primary NBRR, the first system information to identify a broadcast NBRR for the NB cell, and means for transmitting second system information over the broadcast NBRR, the second system information to comprise one or more NB system information blocks (NB-SIBs).

Example 50 is the apparatus of Example 49, the broadcast NBRR to comprise a 180 kHz bandwidth or a 200 kHz bandwidth.

Example 51 is the apparatus of any of Examples 49 to 50, the first system information to comprise an NB master information block (NB-MIB).

Example 52 is the apparatus of any of Examples 49 to 51, the first system information to comprise one or more NB system information blocks (NB-SIBs).

Example 53 is the apparatus of any of Examples 49 to 52, comprising means for transmitting one or more NB paging messages over the broadcast NBRR.

Example 54 is the apparatus of any of Examples 49 to 53, comprising means for transmitting one or more NB random access responses (NB-RARs) over the broadcast NBRR.

Example 55 is the apparatus of any of Examples 49 to 54, comprising means for transmitting a broadcast NBRR information notification to an NB-UE to instruct the NB-UE to tune to the broadcast NBRR.

Example 56 is the apparatus of Example 55, comprising means for transmitting the broadcast NBRR information notification over a standard NBRR of the NB cell.

Example 57 is the apparatus of any of Examples 55 to 56, the broadcast NBRR information notification to be comprised in an NB radio resource control (RRC) message.

Example 58 is the apparatus of any of Examples 55 to 56, the broadcast NBRR information notification to comprise unicasted downlink control information (DCI).

Example 59 is the apparatus of any of Examples 55 to 56, the broadcast NBRR information notification to comprise broadcasted downlink control information (DCI).

Example 60 is a system, comprising an apparatus according to any of Examples 49 to 59, and at least one radio frequency (RF) transceiver.

Example 61 is the system of Example 60, comprising at least one processor.

Example 62 is the system of any of Examples 60 to 61, comprising at least one RF antenna.

Example 63 is at least one computer-readable storage medium comprising a set of instructions that, in response to being executed at a narrowband evolved node B (NB-eNB), cause the NB-eNB to identify a broadcast narrowband resource region (NBRR) for an NB cell, identify system information to be provided to one or more NB user equipments (NB-UEs) in the NB cell, and transmit a system information message over the broadcast NBRR, the system information message to comprise the identified system information.

Example 64 is the at least one computer-readable storage medium of Example 63, the broadcast NBRR to comprise a 180 kHz bandwidth or a 200 kHz bandwidth.

Example 65 is the at least one computer-readable storage medium of any of Examples 63 to 64, the system information message to comprise an NB master information block (NB-MIB).

Example 66 is the at least one computer-readable storage medium of any of Examples 63 to 65, the system information message to comprise one or more NB system information blocks (NB-SIBs).

Example 67 is the at least one computer-readable storage medium of any of Examples 63 to 66, comprising instructions that, in response to being executed at the NB-eNB, cause the NB-eNB to transmit one or more NB paging messages over the broadcast NBRR.

Example 68 is the at least one computer-readable storage medium of any of Examples 63 to 67, comprising instructions that, in response to being executed at the NB-eNB, cause the NB-eNB to transmit one or more NB random access responses (NB-RARs) over the broadcast NBRR.

Example 69 is the at least one computer-readable storage medium of any of Examples 63 to 68, comprising instructions that, in response to being executed at the NB-eNB, cause the NB-eNB to transmit a broadcast NBRR information notification to an NB-UE to instruct the NB-UE to tune to the broadcast NBRR.

Example 70 is the at least one computer-readable storage medium of Example 69, comprising instructions that, in response to being executed at the NB-eNB, cause the NB-eNB to transmit the broadcast NBRR information notification over a standard NBRR of the NB cell.

Example 71 is the at least one computer-readable storage medium of any of Examples 69 to 70, the broadcast NBRR information notification to be comprised in an NB radio resource control (RRC) message.

Example 72 is the at least one computer-readable storage medium of any of Examples 69 to 70, the broadcast NBRR information notification to comprise unicasted downlink control information (DCI).

Example 73 is the at least one computer-readable storage medium of any of Examples 69 to 70, the broadcast NBRR information notification to comprise broadcasted downlink control information (DCI).

Example 74 is the at least one computer-readable storage medium of any of Examples 63 to 73, comprising instructions that, in response to being executed at the NB-eNB, cause the NB-eNB to identify a primary NBRR of the NB cell, and transmit one or more NB synchronization signals over the primary NBRR.

Example 75 is the at least one computer-readable storage medium of Example 74, comprising instructions that, in response to being executed at the NB-eNB, cause the NB-eNB to transmit an NB master information block (NB-MIB) over the primary NBRR.

Example 76 is the at least one computer-readable storage medium of Example 75, the NB-MIB to comprise information identifying the broadcast NBRR of the NB cell.

Example 77 is a method, comprising transmitting, from a narrowband evolved node B (NB-eNB), one or more NB synchronization signals over a primary NB resource region (NBRR) of an NB cell, transmitting first system information over the primary NBRR, the first system information to identify a broadcast NBRR for the NB cell, and transmitting second system information over the broadcast NBRR, the second system information to comprise one or more NB system information blocks (NB-SIBs).

Example 78 is the method of Example 77, the broadcast NBRR to comprise a 180 kHz bandwidth or a 200 kHz bandwidth.

Example 79 is the method of any of Examples 77 to 78, the first system information to comprise an NB master information block (NB-MIB).

Example 80 is the method of any of Examples 77 to 79, the first system information to comprise one or more NB system information blocks (NB-SIBs).

Example 81 is the method of any of Examples 77 to 80, comprising transmitting one or more NB paging messages over the broadcast NBRR.

Example 82 is the method of any of Examples 77 to 81, comprising transmitting one or more NB random access responses (NB-RARs) over the broadcast NBRR.

Example 83 is the method of any of Examples 77 to 82, comprising transmitting a broadcast NBRR information notification to an NB-UE to instruct the NB-UE to tune to the broadcast NBRR.

Example 84 is the method of Example 83, comprising transmitting the broadcast NBRR information notification over a standard NBRR of the NB cell.

Example 85 is the method of any of Examples 83 to 84, the broadcast NBRR information notification to be comprised in an NB radio resource control (RRC) message.

Example 86 is the method of any of Examples 83 to 84, the broadcast NBRR information notification to comprise unicasted downlink control information (DCI).

Example 87 is the method of any of Examples 83 to 84, the broadcast NBRR information notification to comprise broadcasted downlink control information (DCI).

Example 88 is at least one computer-readable storage medium comprising a set of instructions that, in response to being executed on a computing device, cause the computing device to perform a method according to any of Examples 77 to 87.

Example 89 is an apparatus, comprising means for performing a method according to any of Examples 77 to 87.

Example 90 is a system, comprising the apparatus of Example 89, and at least one radio frequency (RF) transceiver.

Example 91 is the system of Example 90, comprising at least one processor.

Example 92 is the system of any of Examples 90 to 91, comprising at least one RF antenna.

Example 93 is an apparatus, comprising means for identifying, at narrowband user equipment (NB-UE), a broadcast narrowband resource region (NBRR) of a serving narrowband (NB) cell of the NB-UE, means for tuning to the broadcast NBRR, and means for determining one or more parameters for wireless communication with an NB-evolved node B (NB-eNB) based on system information received from the NB-eNB via the broadcast NBRR.

Example 94 is the apparatus of Example 93, the broadcast NBRR to comprise a 180 kHz bandwidth or a 200 kHz bandwidth.

Example 95 is the apparatus of any of Examples 93 to 94, the system information received via the broadcast NBRR to include an NB master information block (NB-MIB).

Example 96 is the apparatus of any of Examples 93 to 95, the system information received via the broadcast NBRR to include one or more NB system information blocks (NB-SIBs).

Example 97 is the apparatus of any of Examples 93 to 96, comprising means for initiating a transition to a radio resource control (RRC) connected state in response to an NB paging message received from the NB-eNB via the broadcast NBRR.

Example 98 is the apparatus of any of Examples 93 to 97, comprising means for identifying an uplink (UL) scheduling grant based on an NB random access response (NB-RAR) received from the NB-eNB via the broadcast NBRR.

Example 99 is the apparatus of any of Examples 93 to 98, comprising means for tuning to the broadcast NBRR in response to a received broadcast NBRR information notification.

Example 100 is the apparatus of Example 99, the broadcast NBRR information notification to be received via a standard NBRR of the NB cell.

Example 101 is the apparatus of any of Examples 99 to 100, the broadcast NBRR information notification to be comprised in a received NB radio resource control (RRC) message.

Example 102 is the apparatus of any of Examples 99 to 100, the broadcast NBRR information notification to comprise unicasted downlink control information (DCI).

Example 103 is the apparatus of any of Examples 99 to 100, the broadcast NBRR information notification to comprise broadcasted downlink control information (DCI).

Example 104 is the apparatus of any of Examples 93 to 103, comprising means for identifying a primary NBRR of the NB cell, means for tuning to the primary NBRR, and means for determining a frame timing of the NB cell based on one or more synchronization signals received from the NB-eNB via the primary NBRR.

Example 105 is the apparatus of Example 104, comprising means for determining one or more parameters for wireless communication with the NB-eNB based on an NB master information block (NB-MIB) received from the NB-eNB via the primary NBRR.

Example 106 is the apparatus of any of Examples 104 to 105, comprising means for identifying the broadcast NBRR based on information received from the NB-eNB via the primary NBRR.

Example 107 is a system, comprising an apparatus according to any of Examples 93 to 106, and at least one radio frequency (RF) transceiver.

Example 108 is the system of Example 107, comprising at least one processor.

Example 109 is the system of any of Examples 107 to 108, comprising at least one RF antenna.

Example 110 is an apparatus, comprising a memory, and logic for narrowband user equipment (NB-UE), at least a portion of which is implemented in circuitry coupled to the memory, the logic to synchronize with a timing of a narrowband (NB) cell based on one or more NB synchronization signals received from an NB evolved node B (NB-eNB) via a primary NB resource region (NBRR) of the NB cell, identify a broadcast NBRR of the NB cell based on information received from the NB-eNB via the primary NBRR, cause the NB-UE to tune to the broadcast NBRR, and determine one or more parameters for wireless communication with the NB-eNB based on system information received from the NB-eNB via the broadcast NBRR.

Example 111 is the apparatus of Example 110, the broadcast NBRR to comprise a 180 kHz bandwidth or a 200 kHz bandwidth.

Example 112 is the apparatus of any of Examples 110 to 111, the system information received via the broadcast NBRR to include an NB master information block (NB-MIB).

Example 113 is the apparatus of any of Examples 110 to 112, the system information received via the broadcast NBRR to include one or more NB system information blocks (NB-SIBs).

Example 114 is the apparatus of any of Examples 110 to 113, the logic to initiate a transition to a radio resource control (RRC) connected state in response to an NB paging message received from the NB-eNB via the broadcast NBRR.

Example 115 is the apparatus of any of Examples 110 to 114, the logic to identify an uplink (UL) scheduling grant based on an NB random access response (NB-RAR) received from the NB-eNB via the broadcast NBRR.

Example 116 is the apparatus of any of Examples 110 to 115, the logic to cause the NB-UE to tune to the broadcast NBRR in response to a received broadcast NBRR information notification.

Example 117 is the apparatus of Example 116, the broadcast NBRR information notification to be received via a standard NBRR of the NB cell.

Example 118 is the apparatus of any of Examples 116 to 117, the broadcast NBRR information notification to be comprised in a received NB radio resource control (RRC) message.

Example 119 is the apparatus of any of Examples 116 to 117, the broadcast NBRR information notification to comprise unicasted downlink control information (DCI).

Example 120 is the apparatus of any of Examples 116 to 117, the broadcast NBRR information notification to comprise broadcasted downlink control information (DCI).

Example 121 is the apparatus of any of Examples 110 to 120, the logic to determine one or more parameters for wireless communication with the NB-eNB based on an NB master information block (NB-MIB) received from the NB-eNB via the primary NBRR.

Example 122 is a system, comprising an apparatus according to any of Examples 110 to 121, and at least one radio frequency (RF) transceiver.

Example 123 is the system of Example 122, comprising at least one processor.

Example 124 is the system of any of Examples 122 to 123, comprising at least one RF antenna.

Example 125 is a method, comprising synchronizing, at narrowband user equipment (NB-UE), with a timing of a narrowband (NB) cell based on one or more NB synchronization signals received from an NB evolved node B (NB-eNB) via a primary NB resource region (NBRR) of the NB cell, identifying a broadcast NBRR of the NB cell based on information received from the NB-eNB via the primary NBRR, tuning to the broadcast NBRR, and determining one or more parameters for wireless communication with the NB-eNB based on system information received from the NB-eNB via the broadcast NBRR.

Example 126 is the method of Example 125, the broadcast NBRR to comprise a 180 kHz bandwidth or a 200 kHz bandwidth.

Example 127 is the method of any of Examples 125 to 126, the system information received via the broadcast NBRR to include an NB master information block (NB-MIB).

Example 128 is the method of any of Examples 125 to 127, the system information received via the broadcast NBRR to include one or more NB system information blocks (NB-SIBs).

Example 129 is the method of any of Examples 125 to 128, comprising initiating a transition to a radio resource control (RRC) connected state in response to an NB paging message received from the NB-eNB via the broadcast NBRR.

Example 130 is the method of any of Examples 125 to 129, comprising identifying an uplink (UL) scheduling grant based on an NB random access response (NB-RAR) received from the NB-eNB via the broadcast NBRR.

Example 131 is the method of any of Examples 125 to 130, comprising tuning to the broadcast NBRR in response to a received broadcast NBRR information notification.

Example 132 is the method of Example 131, the broadcast NBRR information notification to be received via a standard NBRR of the NB cell.

Example 133 is the method of any of Examples 131 to 132, the broadcast NBRR information notification to be comprised in a received NB radio resource control (RRC) message.

Example 134 is the method of any of Examples 131 to 132, the broadcast NBRR information notification to comprise unicasted downlink control information (DCI).

Example 135 is the method of any of Examples 131 to 132, the broadcast NBRR information notification to comprise broadcasted downlink control information (DCI).

Example 136 is the method of any of Examples 125 to 135, comprising determining one or more parameters for wireless communication with the NB-eNB based on an NB master information block (NB-MIB) received from the NB-eNB via the primary NBRR.

Example 137 is at least one computer-readable storage medium comprising a set of instructions that, in response to being executed on a computing device, cause the computing device to perform a method according to any of Examples 125 to 136.

Example 138 is an apparatus, comprising means for performing a method according to any of Examples 125 to 136.

Example 139 is a system, comprising the apparatus of Example 138, and at least one radio frequency (RF) transceiver.

Example 140 is the system of Example 139, comprising at least one processor.

Example 141 is the system of any of Examples 139 to 140, comprising at least one RF antenna.

Example 142 is an apparatus, comprising means for identifying, at a narrowband evolved node B (NB-eNB), a broadcast narrowband resource region (NBRR) for an NB cell, means for identifying system information to be provided to one or more NB user equipments (NB-UEs) in the NB cell, and means for transmitting a system information message over the broadcast NBRR, the system information message to comprise the identified system information.

Example 143 is the apparatus of Example 142, the broadcast NBRR to comprise a 180 kHz bandwidth or a 200 kHz bandwidth.

Example 144 is the apparatus of any of Examples 142 to 143, the system information message to comprise an NB master information block (NB-MIB).

Example 145 is the apparatus of any of Examples 142 to 144, the system information message to comprise one or more NB system information blocks (NB-SIBs).

Example 146 is the apparatus of any of Examples 142 to 145, comprising means for transmitting one or more NB paging messages over the broadcast NBRR.

Example 147 is the apparatus of any of Examples 142 to 146, comprising means for transmitting one or more NB random access responses (NB-RARs) over the broadcast NBRR.

Example 148 is the apparatus of any of Examples 142 to 147, comprising means for transmitting a broadcast NBRR information notification to an NB-UE to instruct the NB-UE to tune to the broadcast NBRR.

Example 149 is the apparatus of Example 148, comprising means for transmitting the broadcast NBRR information notification over a standard NBRR of the NB cell.

Example 150 is the apparatus of any of Examples 148 to 149, the broadcast NBRR information notification to be comprised in an NB radio resource control (RRC) message.

Example 151 is the apparatus of any of Examples 148 to 149, the broadcast NBRR information notification to comprise unicasted downlink control information (DCI).

Example 152 is the apparatus of any of Examples 148 to 149, the broadcast NBRR information notification to comprise broadcasted downlink control information (DCI).

Example 153 is the apparatus of any of Examples 142 to 152, comprising means for identifying a primary NBRR of the NB cell, and means for transmitting one or more NB synchronization signals over the primary NBRR.

Example 154 is the apparatus of Example 153, comprising means for transmitting an NB master information block (NB-MIB) over the primary NBRR.

Example 155 is the apparatus of Example 154, the NB-MIB to comprise information identifying the broadcast NBRR of the NB cell.

Example 156 is a system, comprising an apparatus according to any of Examples 142 to 155, and at least one radio frequency (RF) transceiver.

Example 157 is the system of Example 156, comprising at least one processor.

Example 158 is the system of any of Examples 156 to 157, comprising at least one RF antenna.

Example 159 is an apparatus, comprising a memory, and logic for a narrowband (NB) evolved node B (eNB), at least a portion of which is implemented in circuitry coupled to the memory, the logic to generate one or more NB synchronization signals for transmission over a primary NB resource region (NBRR) of an NB cell, generate first system information for transmission over the primary NBRR, the first system information to identify a broadcast NBRR for the NB cell, and generate second system information for transmission over the broadcast NBRR, the second system information to comprise one or more NB system information blocks (NB-SIBs).

Example 160 is the apparatus of Example 159, the broadcast NBRR to comprise a 180 kHz bandwidth or a 200 kHz bandwidth.

Example 161 is the apparatus of any of Examples 159 to 160, the first system information to comprise an NB master information block (NB-MIB).

Example 162 is the apparatus of any of Examples 159 to 161, the first system information to comprise one or more NB system information blocks (NB-SIBs).

Example 163 is the apparatus of any of Examples 159 to 162, the logic to generate one or more NB paging messages for transmission over the broadcast NBRR.

Example 164 is the apparatus of any of Examples 159 to 163, the logic to generate one or more NB random access responses (NB-RARs) for transmission over the broadcast NBRR.

Example 165 is the apparatus of any of Examples 159 to 164, the logic to generate a broadcast NBRR information notification for transmission to an NB-UE to instruct the NB-UE to tune to the broadcast NBRR.

Example 166 is the apparatus of Example 165, the logic to generate the broadcast NBRR information notification for transmission over a standard NBRR of the NB cell.

Example 167 is the apparatus of any of Examples 165 to 166, the broadcast NBRR information notification to be comprised in an NB radio resource control (RRC) message.

Example 168 is the apparatus of any of Examples 165 to 166, the broadcast NBRR information notification to comprise unicasted downlink control information (DCI).

Example 169 is the apparatus of any of Examples 165 to 166, the broadcast NBRR information notification to comprise broadcasted downlink control information (DCI).

Example 170 is a system, comprising an apparatus according to any of Examples 159 to 169, and at least one radio frequency (RF) transceiver.

Example 171 is the system of Example 170, comprising at least one processor.

Example 172 is the system of any of Examples 170 to 171, comprising at least one RF antenna.

Example 173 is at least one computer-readable storage medium comprising a set of instructions that, in response to being executed at narrowband user equipment (NB-UE), cause the NB-UE to identify a broadcast narrowband resource region (NBRR) of a serving narrowband (NB) cell of the NB-UE, tune to the broadcast NBRR, and determine one or more parameters for wireless communication with an NB-evolved node B (NB-eNB) based on system information received from the NB-eNB via the broadcast NBRR.

Example 174 is the at least one computer-readable storage medium of Example 173, the broadcast NBRR to comprise a 180 kHz bandwidth or a 200 kHz bandwidth.

Example 175 is the at least one computer-readable storage medium of any of Examples 173 to 174, the system information received via the broadcast NBRR to include an NB master information block (NB-MIB).

Example 176 is the at least one computer-readable storage medium of any of Examples 173 to 175, the system information received via the broadcast NBRR to include one or more NB system information blocks (NB-SIBs).

Example 177 is the at least one computer-readable storage medium of any of Examples 173 to 176, comprising instructions that, in response to being executed at the NB-UE, cause the NB-UE to initiate a transition to a radio resource control (RRC) connected state in response to an NB paging message received from the NB-eNB via the broadcast NBRR.

Example 178 is the at least one computer-readable storage medium of any of Examples 173 to 177, comprising instructions that, in response to being executed at the NB-UE, cause the NB-UE to identify an uplink (UL) scheduling grant based on an NB random access response (NB-RAR) received from the NB-eNB via the broadcast NBRR.

Example 179 is the at least one computer-readable storage medium of any of Examples 173 to 178, comprising instructions that, in response to being executed at the NB-UE, cause the NB-UE to tune to the broadcast NBRR in response to a received broadcast NBRR information notification.

Example 180 is the at least one computer-readable storage medium of Example 179, the broadcast NBRR information notification to be received via a standard NBRR of the NB cell.

Example 181 is the at least one computer-readable storage medium of any of Examples 179 to 180, the broadcast NBRR information notification to be comprised in a received NB radio resource control (RRC) message.

Example 182 is the at least one computer-readable storage medium of any of Examples 179 to 180, the broadcast NBRR information notification to comprise unicasted downlink control information (DCI).

Example 183 is the at least one computer-readable storage medium of any of Examples 179 to 180, the broadcast NBRR information notification to comprise broadcasted downlink control information (DCI).

Example 184 is the at least one computer-readable storage medium of any of Examples 173 to 183, comprising instructions that, in response to being executed at the NB-UE, cause the NB-UE to identify a primary NBRR of the NB cell, tune to the primary NBRR, and determine a frame timing of the NB cell based on one or more synchronization signals received from the NB-eNB via the primary NBRR.

Example 185 is the at least one computer-readable storage medium of Example 184, comprising instructions that, in response to being executed at the NB-UE, cause the NB-UE to determine one or more parameters for wireless communication with the NB-eNB based on an NB master information block (NB-MIB) received from the NB-eNB via the primary NBRR.

Example 186 is the at least one computer-readable storage medium of any of Examples 184 to 185, comprising instructions that, in response to being executed at the NB-UE, cause the NB-UE to identify the broadcast NBRR based on information received from the NB-eNB via the primary NBRR.

Example 187 is an apparatus, comprising means for synchronizing, at narrowband user equipment (NB-UE), with a timing of a narrowband (NB) cell based on one or more NB synchronization signals received from an NB evolved node B (NB-eNB) via a primary NB resource region (NBRR) of the NB cell, means for identifying a broadcast NBRR of the NB cell based on information received from the NB-eNB via the primary NBRR, means for tuning to the broadcast NBRR, and means for determining one or more parameters for wireless communication with the NB-eNB based on system information received from the NB-eNB via the broadcast NBRR.

Example 188 is the apparatus of Example 187, the broadcast NBRR to comprise a 180 kHz bandwidth or a 200 kHz bandwidth.

Example 189 is the apparatus of any of Examples 187 to 188, the system information received via the broadcast NBRR to include an NB master information block (NB-MIB).

Example 190 is the apparatus of any of Examples 187 to 189, the system information received via the broadcast NBRR to include one or more NB system information blocks (NB-SIBs).

Example 191 is the apparatus of any of Examples 187 to 190, comprising means for initiating a transition to a radio resource control (RRC) connected state in response to an NB paging message received from the NB-eNB via the broadcast NBRR.

Example 192 is the apparatus of any of Examples 187 to 191, comprising means for identifying an uplink (UL) scheduling grant based on an NB random access response (NB-RAR) received from the NB-eNB via the broadcast NBRR.

Example 193 is the apparatus of any of Examples 187 to 192, comprising means for tuning to the broadcast NBRR in response to a received broadcast NBRR information notification.

Example 194 is the apparatus of Example 193, the broadcast NBRR information notification to be received via a standard NBRR of the NB cell.

Example 195 is the apparatus of any of Examples 193 to 194, the broadcast NBRR information notification to be comprised in a received NB radio resource control (RRC) message.

Example 196 is the apparatus of any of Examples 193 to 194, the broadcast NBRR information notification to comprise unicasted downlink control information (DCI).

Example 197 is the apparatus of any of Examples 193 to 194, the broadcast NBRR information notification to comprise broadcasted downlink control information (DCI).

Example 198 is the apparatus of any of Examples 187 to 197, comprising means for determining one or more parameters for wireless communication with the NB-eNB based on an NB master information block (NB-MIB) received from the NB-eNB via the primary NBRR.

Example 199 is a system, comprising an apparatus according to any of Examples 187 to 198, and at least one radio frequency (RF) transceiver.

Example 200 is the system of Example 199, comprising at least one processor.

Example 201 is the system of any of Examples 199 to 200, comprising at least one RF antenna.

Example 202 is an apparatus, comprising a memory, and logic for a narrowband (NB) evolved node B (eNB), at least a portion of which is implemented in circuitry coupled to the memory, the logic to identify a broadcast narrowband resource region (NBRR) for an NB cell, identify system information to be provided to one or more NB user equipments (NB-UEs) in the NB cell, and generate a system information message for transmission over the broadcast NBRR, the system information message to comprise the identified system information.

Example 203 is the apparatus of Example 202, the broadcast NBRR to comprise a 180 kHz bandwidth or a 200 kHz bandwidth.

Example 204 is the apparatus of any of Examples 202 to 203, the system information message to comprise an NB master information block (NB-MIB).

Example 205 is the apparatus of any of Examples 202 to 204, the system information message to comprise one or more NB system information blocks (NB-SIBs).

Example 206 is the apparatus of any of Examples 202 to 205, the logic to generate one or more NB paging messages for transmission over the broadcast NBRR.

Example 207 is the apparatus of any of Examples 202 to 206, the logic to generate one or more NB random access responses (NB-RARs) for transmission over the broadcast NBRR.

Example 208 is the apparatus of any of Examples 202 to 207, the logic to generate a broadcast NBRR information notification for transmission to an NB-UE to instruct the NB-UE to tune to the broadcast NBRR.

Example 209 is the apparatus of Example 208, the logic to generate the broadcast NBRR information notification for transmission over a standard NBRR of the NB cell.

Example 210 is the apparatus of any of Examples 208 to 209, the broadcast NBRR information notification to be comprised in an NB radio resource control (RRC) message.

Example 211 is the apparatus of any of Examples 208 to 209, the broadcast NBRR information notification to comprise unicasted downlink control information (DCI).

Example 212 is the apparatus of any of Examples 208 to 209, the broadcast NBRR information notification to comprise broadcasted downlink control information (DCI).

Example 213 is the apparatus of any of Examples 202 to 212, the logic to identify a primary NBRR of the NB cell, and generate one or more NB synchronization signals for transmission over the primary NBRR.

Example 214 is the apparatus of Example 213, the logic to generate an NB master information block (NB-MIB) for transmission over the primary NBRR.

Example 215 is the apparatus of Example 214, the NB-MIB to comprise information identifying the broadcast NBRR of the NB cell.

Example 216 is a system, comprising an apparatus according to any of Examples 202 to 215, and at least one radio frequency (RF) transceiver.

Example 217 is the system of Example 216, comprising at least one processor.

Example 218 is the system of any of Examples 216 to 217, comprising at least one RF antenna.

Example 219 is at least one computer-readable storage medium comprising a set of instructions that, in response to being executed at a narrowband evolved node B (NB-eNB), cause the NB-eNB to transmit one or more NB synchronization signals over a primary NB resource region (NBRR) of an NB cell, transmit first system information over the primary NBRR, the first system information to identify a broadcast NBRR for the NB cell, and transmit second system information over the broadcast NBRR, the second system information to comprise one or more NB system information blocks (NB-SIBs).

Example 220 is the at least one computer-readable storage medium of Example 219, the broadcast NBRR to comprise a 180 kHz bandwidth or a 200 kHz bandwidth.

Example 221 is the at least one computer-readable storage medium of any of Examples 219 to 220, the first system information to comprise an NB master information block (NB-MIB).

Example 222 is the at least one computer-readable storage medium of any of Examples 219 to 221, the first system information to comprise one or more NB system information blocks (NB-SIBs).

Example 223 is the at least one computer-readable storage medium of any of Examples 219 to 222, comprising instructions that, in response to being executed at the NB-eNB, cause the NB-eNB to transmit one or more NB paging messages over the broadcast NBRR.

Example 224 is the at least one computer-readable storage medium of any of Examples 219 to 223, comprising instructions that, in response to being executed at the NB-eNB, cause the NB-eNB to transmit one or more NB random access responses (NB-RARs) over the broadcast NBRR.

Example 225 is the at least one computer-readable storage medium of any of Examples 219 to 224, comprising instructions that, in response to being executed at the NB-eNB, cause the NB-eNB to transmit a broadcast NBRR information notification to an NB-UE to instruct the NB-UE to tune to the broadcast NBRR.

Example 226 is the at least one computer-readable storage medium of Example 225, comprising instructions that, in response to being executed at the NB-eNB, cause the NB-eNB to transmit the broadcast NBRR information notification over a standard NBRR of the NB cell.

Example 227 is the at least one computer-readable storage medium of any of Examples 225 to 226, the broadcast NBRR information notification to be comprised in an NB radio resource control (RRC) message.

Example 228 is the at least one computer-readable storage medium of any of Examples 225 to 226, the broadcast NBRR information notification to comprise unicasted downlink control information (DCI).

Example 229 is the at least one computer-readable storage medium of any of Examples 225 to 226, the broadcast NBRR information notification to comprise broadcasted downlink control information (DCI).

Example 230 is a method, comprising identifying, at narrowband user equipment (NB-UE), a broadcast narrowband resource region (NBRR) of a serving narrowband (NB) cell of the NB-UE, tuning to the broadcast NBRR, and determining one or more parameters for wireless communication with an NB-evolved node B (NB-eNB) based on system information received from the NB-eNB via the broadcast NBRR.

Example 231 is the method of Example 230, the broadcast NBRR to comprise a 180 kHz bandwidth or a 200 kHz bandwidth.

Example 232 is the method of any of Examples 230 to 231, the system information received via the broadcast NBRR to include an NB master information block (NB-MIB).

Example 233 is the method of any of Examples 230 to 232, the system information received via the broadcast NBRR to include one or more NB system information blocks (NB-SIBs).

Example 234 is the method of any of Examples 230 to 233, comprising initiating a transition to a radio resource control (RRC) connected state in response to an NB paging message received from the NB-eNB via the broadcast NBRR.

Example 235 is the method of any of Examples 230 to 234, comprising identifying an uplink (UL) scheduling grant based on an NB random access response (NB-RAR) received from the NB-eNB via the broadcast NBRR.

Example 236 is the method of any of Examples 230 to 235, comprising tuning to the broadcast NBRR in response to a received broadcast NBRR information notification.

Example 237 is the method of Example 236, the broadcast NBRR information notification to be received via a standard NBRR of the NB cell.

Example 238 is the method of any of Examples 236 to 237, the broadcast NBRR information notification to be comprised in a received NB radio resource control (RRC) message.

Example 239 is the method of any of Examples 236 to 237, the broadcast NBRR information notification to comprise unicasted downlink control information (DCI).

Example 240 is the method of any of Examples 236 to 237, the broadcast NBRR information notification to comprise broadcasted downlink control information (DCI).

Example 241 is the method of any of Examples 230 to 240, comprising identifying a primary NBRR of the NB cell, tuning to the primary NBRR, and determining a frame timing of the NB cell based on one or more synchronization signals received from the NB-eNB via the primary NBRR.

Example 242 is the method of Example 241, comprising determining one or more parameters for wireless communication with the NB-eNB based on an NB master information block (NB-MIB) received from the NB-eNB via the primary NBRR.

Example 243 is the method of any of Examples 241 to 242, comprising identifying the broadcast NBRR based on information received from the NB-eNB via the primary NBRR.

Example 244 is at least one computer-readable storage medium comprising a set of instructions that, in response to being executed on a computing device, cause the computing device to perform a method according to any of Examples 230 to 243.

Example 245 is an apparatus, comprising means for performing a method according to any of Examples 230 to 243.

Example 246 is a system, comprising the apparatus of Example 245, and at least one radio frequency (RF) transceiver.

Example 247 is the system of Example 246, comprising at least one processor.

Example 248 is the system of any of Examples 246 to 247, comprising at least one RF antenna.

Example 249 is a system and method of narrowband (NB) wireless communication for Machine Type Communication (MTC) or Cellular Internet of Things (CIoT), wherein one or multiple NBs are used, such as, based on LTE, the NB-LTE deployment.

Example 250 is the system and method of Example 249, wherein specific NB region is defined to mainly contain majority of the common control information, refer as Broadcast NB (Broadcast-NB).

Example 251 is the system and method of Example 250, wherein only one Broadcast-NB region is defined for the same instant of time.

Example 252 is the system and method of Example 250, wherein multiple Broadcast-NB regions are defined for the same instant of time from the network perspective.

Example 253 is the system and method of Example 250, wherein the same Broadcast-NB region is used across different instants of time by the UE for monitoring of common control message transmissions.

Example 254 is the system and method of Example 250, wherein the different Broadcast-NB region is used across different instants of time by the UE for monitoring of common control message transmissions.

Example 255 is the system and method of Example 250, wherein the Broadcast-NB region carries among other information, information related to the system configuration, paging and random access response.

Example 256 is the system and method of Example 249, wherein the UEs operating in NB (NB-UE) receive majority of broadcast information from the Broadcast-NB region described in Example 1.

Example 257 is the NB-UE of Example 256, wherein, when in connected mode operating in a DL NB region for its unicast transmissions, the NB-UE receives indication within the monitored DL NB region to get the updated information in the Broadcast-NB.

Example 258 is the NB-UE of Example 257, wherein the NB-UE receives the indication to monitor the Broadcast-NB though unicast signaling sent in NB-PDSCH or NB-PDCCH or though broadcast signaling send in NB-PDCCH.

Example 259 is the NB-UE of Example 257, wherein the NB-UE receives the indication to monitor the Broadcast-NB in a new form of signaling or extending existing LTE one.

Example 260 is the NB-UE of Example 256, wherein the NB-UE can be in connected DRX mode operating in a DL NB region for its unicast transmissions however monitoring the Broadcast-NB during its DRX "ON" durations.

Example 261 is the method of Example 255, wherein different kind of broadcast information is sent at different instance of time within Broadcast-NB region.

Example 262 is the method of Example 255, wherein different kind of broadcast information sent in Broadcast-NB is sent with different periodicities within the Broadcast-NB region.

Example 263 is the method of Example 249, wherein, for any narrowband not carrying NB-PSS/NB-SSS or NB-PBCH transmissions, it is specified that mapping of NB-PDCCH or NB-PDSCH symbols to Resource Elements (REs) occurs without consideration of transmission of NB-PSS/NB-SSS or NB-PBCH, and wherein the narrowband UE (NB-UE) knows the locations of the narrowbands that are used to transmit NB-PSS/NB-SSS or NB-PBCH.

Example 264 is the method of Example 263, wherein, for the narrowbands other than the Primary Narrowband, it is specified that mapping of NB-PDCCH or NB-PDSCH symbols to Resource Elements (REs) occurs without consideration of transmission of NB-PSS/NB-SSS or NB-PBCH, wherein the Primary Narrowband is the narrowband carrying the NB-PSS/NB-SSS or NB-PBCH.

Example 265 is the method of Example 263, wherein the one or more narrowbands carrying NB-PSS/NB-SSS or NB-PBCH is/are specified as a function of the LTE system BW, or, wherein they are signaled by the eNodeB to the NB-UEs via NB-Master Information Block (NB-MIB) carried by the NB-PBCH.

Example 266 is the method of Example 263, wherein the narrowbands that may be used to transmit NB-PSS/NB-SSS or NB-PBCH, when multiple narrowbands can be used to transmit NB-PSS/NB-SSS or NB-PBCH, are fixed in the specifications, and one bit in the NB-MIB is used to indicate to the NB-UE if the NB-PSS/NB-SSS or NB-PBCH are transmitted on a single narrowband or on multiple narrowbands.

Example 267 is the method of Example 249, wherein, the eNodeB indicates to the narrowband UE (NB-UE) of whether to assume rate-matching around the NB-PSS/NB-SSS or NB-PBCH for one or more narrowbands, wherein the information is configured via the NB-PBCH or via System Information Block (SIB) signaling.

Example 268 is the method of Example 267, wherein one bit in the Narrowband-Master Information Block (NB-MIB) is used to indicate to the NB-UE that all other narrowbands (or all narrowbands other than those carrying NB-PSS/NB-SSS or NB-PBCH) apply RE mapping for NB-PDCCH and NB-PDSCH without considering the presence of NB-PSS/NB-SSS or NB-PBCH transmissions.

Example 269 is the method of Example 267, wherein the SIB signaling is either transmitted in the same or different narrowband from those used to transmit the NB-PSS/NB-SSS or NB-PBCH.

Example 270 is the method of Example 267, wherein SIB signaling is used by the eNodeB to indicate to the NB-UE whether RE mapping for NB-PDCCH or NB-PDSCH in each of the other configured narrowbands does or does not consider the presence of NB-PSS/NB-SSS or NB-PBCH.

Example 271 is the method of Example 269, wherein the eNodeB indicates to the NB-UE via SIB signaling whether the RE mapping for NB-PDCCH or NB-PDSCH for other configured narrowbands except the current narrowband does or does not consider the presence of NB-PSS/NB-SSS or NB-PBCH, i.e., whether to perform rate-matching around NB-PSS/NB-SSS or NB-PBCH locations when receiving NB-PDCCH or NB-PDSCH on other narrowbands, and wherein the relevant SIB is specified to be always transmitted in the same narrowband as the NB-PSS/NB-SSS and NB-PBCH.

Example 272 is the method of Example 269, wherein if the relevant SIB may (or may not) be transmitted in a different narrowband from those carrying the NB-PSS/NB-SSS or NB-PBCH, then it is specified that, for the narrowband carrying the SIB, either the NB-UE always assumes that the NB-PDCCH or NB-PDSCH is always rate-matched around the locations for NB-PSS/NB-SSS or NB-PBCH, or that the NB-UE assumes that NB-PSS/NB-SSS or NB-PBCH always puncture the NB-PDCCH or NB-PDSCH REs.

Example 273 is the method of Example 269, wherein if the relevant SIB may (or may not) be transmitted in a different narrowband from those carrying the NB-PSS/NB-SSS or NB-PBCH, then the eNodeB indicates to the NB-UE via SIB signaling whether RE mapping for NB-PDCCH or NB-PDSCH in the configured narrowbands other than the current narrowband and other than the one or more (including all of) those narrowbands containing NB-PSS/NB-SSS or NB-PBCH (if those narrowbands are made known to the NB-UE) does or does not consider presence of NB-PSS/NB-SSS or NB-PBCH.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory;
logic for narrowband user equipment (NB-UE), at least a portion of the logic implemented in circuitry coupled to the memory, the logic to
identify a broadcast narrowband resource region (NBRR) of a serving narrowband (NB) cell of the NB-UE;
cause the NB-UE to tune to the broadcast NBRR;
determine one or more parameters for wireless communication with an NB-evolved node B (NB-eNB) based on system information received from the NB-eNB via the broadcast NBRR; and
identify an uplink (UL) scheduling grant based on an NB random access response (NB-RAR) received from the NB-eNB via the broadcast NBRR.

2. The apparatus of claim 1, the broadcast NBRR to comprise a 180 kHz bandwidth or a 200 kHz bandwidth.

3. The apparatus of claim 1, the system information received via the broadcast NBRR to include an NB master information block (NB-MIB).

4. The apparatus of claim 1, the system information received via the broadcast NBRR to include one or more NB system information blocks (NB-SIBs).

5. The apparatus of claim 1, the logic to initiate a transition to a radio resource control (RRC) connected state in response to an NB paging message received from the NB-eNB via the broadcast NBRR.

6. The apparatus of claim 1, comprising
at least one radio frequency (RF) transceiver.

7. At least one non-transitory computer-readable storage medium comprising a set of instructions that, in response to being executed at narrowband user equipment (NB-UE), cause the NB-UE to:
synchronize with a timing of a narrowband (NB) cell based on one or more NB synchronization signals received from an NB evolved node B (NB-eNB) via a primary NB resource region (NBRR) of the NB cell;
identify a broadcast NBRR of the NB cell based on information received from the NB-eNB via the primary NBRR;
tune to the broadcast NBRR;
determine one or more parameters for wireless communication with the NB-eNB based on system information received from the NB-eNB via the broadcast NBRR; and
identify an uplink (UL) scheduling grant based on an NB random access response (NB-RAR) received from the NB-eNB via the broadcast NBRR.

8. The at least one computer-readable storage medium of claim 7, comprising instructions that, in response to being executed at the NB-UE, cause the NB-UE to tune to the broadcast NBRR in response to a received broadcast NBRR information notification.

9. The at least one computer-readable storage medium of claim 8, the broadcast NBRR information notification to be received via a standard NBRR of the NB cell.

10. The at least one computer-readable storage medium of claim 8, the broadcast NBRR information notification to be comprised in a received NB radio resource control (RRC) message.

11. The at least one computer-readable storage medium of claim 8, the broadcast NBRR information notification to comprise unicasted downlink control information (DCI).

12. The at least one computer-readable storage medium of claim 8, the broadcast NBRR information notification to comprise broadcasted downlink control information (DCI).

13. An apparatus, comprising:
a memory; and
logic for a narrowband (NB) evolved node B (eNB), at least a portion of which is implemented in circuitry coupled to the memory, the logic to:
identify a broadcast narrowband resource region (NBRR) for an NB cell;
identify system information to be provided to one or more NB user equipments (NB-UEs) in the NB cell;
generate a system information message for transmission over the broadcast NBRR, the system information message to comprise the identified system information; and
generate a NB random access response (NB-RAR) for transmission over the broadcast NBRR, the NB-RAR to include an uplink (UL) scheduling grant for the one or more NB-UEs.

14. The apparatus of claim 13, the logic to generate a broadcast NBRR information notification for transmission to an NB-UE to instruct the NB-UE to tune to the broadcast NBRR.

15. The apparatus of claim 14, the logic to generate the broadcast NBRR information notification for transmission over a standard NBRR of the NB cell.

16. The apparatus of claim 14, the broadcast NBRR information notification to be comprised in an NB radio resource control (RRC) message.

17. The apparatus of claim 14, the broadcast NBRR information notification to comprise unicasted downlink control information (DCI).

18. The apparatus of claim 14, the broadcast NBRR information notification to comprise broadcasted downlink control information (DCI).

19. At least one non-transitory computer-readable storage medium comprising a set of instructions that, in response to being executed at a narrowband evolved node B (NB-eNB), cause the NB-eNB to:
transmit one or more NB synchronization signals over a primary NB resource region (NBRR) of an NB cell;
transmit first system information over the primary NBRR, the first system information to identify a broadcast NBRR for the NB cell;
transmit second system information over the broadcast NBRR, the second system information to comprise one or more NB system information blocks (NB-SIBs); and
transmit a NB random access response (NB-RAR) over the broadcast NBRR, the NB-RAR to include an uplink (UL) scheduling grant.

20. The at least one computer-readable storage medium of claim 19, the broadcast NBRR to comprise a 180 kHz bandwidth or a 200 kHz bandwidth.

21. The at least one computer-readable storage medium of claim 19, the first system information to comprise an NB master information block (NB-MIB).

22. The at least one computer-readable storage medium of claim 19, the first system information to comprise one or more NB system information blocks (NB-SIBs).

23. The at least one computer-readable storage medium of claim 19, comprising instructions that, in response to being executed at the NB-eNB, cause the NB-eNB to transmit one or more NB paging messages over the broadcast NBRR.

* * * * *